(12) United States Patent
Aune et al.

(10) Patent No.: US 11,900,671 B2
(45) Date of Patent: Feb. 13, 2024

(54) PREDICTING HORTICULTURAL YIELD FOR A FIELD LOCATION USING MULTI-BAND AERIAL IMAGERY

(71) Applicant: CLIMATE LLC, Saint Louis, MO (US)

(72) Inventors: Taylor Aune, San Francisco, CA (US); Keely Roth, San Francisco, CA (US)

(73) Assignee: CLIMATE LLC, Saint Louis, MO (US)

( * ) Notice: Subject to any disclaimer, the term of this patent is extended or adjusted under 35 U.S.C. 154(b) by 300 days.

(21) Appl. No.: 17/377,251

(22) Filed: Jul. 15, 2021

(65) Prior Publication Data

US 2022/0019795 A1 Jan. 20, 2022

Related U.S. Application Data

(60) Provisional application No. 63/052,939, filed on Jul. 16, 2020.

(51) Int. Cl.
*G06K 9/00* (2022.01)
*G06K 9/62* (2022.01)
*G06N 3/08* (2023.01)
*G06N 3/04* (2023.01)
*G06V 20/10* (2022.01)
*G06F 18/214* (2023.01)

(52) U.S. Cl.
CPC .......... *G06V 20/188* (2022.01); *G06F 18/214* (2023.01); *G06N 3/04* (2013.01); *G06N 3/08* (2013.01)

(58) Field of Classification Search
CPC ...... G06V 20/188; G06F 18/214; G06N 3/04; G06N 3/08
See application file for complete search history.

(56) References Cited

U.S. PATENT DOCUMENTS

| | | |
|---|---|---|
| 2016/0253595 A1 | 9/2016 | Mathur et al. |
| 2019/0019008 A1 | 1/2019 | Guan et al. |
| 2019/0075727 A1 | 3/2019 | Duke et al. |
| 2019/0362146 A1* | 11/2019 | Polzounov ............. G06N 3/045 |
| 2020/0125929 A1 | 4/2020 | Guo et al. |
| 2020/0126232 A1* | 4/2020 | Guo ......................... G06N 3/08 |
| 2020/0193589 A1 | 6/2020 | Peshlov et al. |
| 2020/0202127 A1* | 6/2020 | Chen .................... G06V 20/188 |

OTHER PUBLICATIONS

International Searching Authority, "Search Report", in Application No. PCT/US2021/041767, dated Oct. 20, 2021, 17 pages.

* cited by examiner

*Primary Examiner* — David F Dunphy
(74) *Attorney, Agent, or Firm* — Harness, Dickey & Pierce, P.L.C.

(57) ABSTRACT

Embodiments of the disclosed technologies are capable of inputting, to a machine-learned classifier that has been created using a set of neural network-based models, multi-band digital image data that represents an aerial view of an agricultural field location containing an horticultural product; outputting, by the classifier, annotated image data, the annotated image data comprising annotation data indicative of individual instances of the horticultural product in the agricultural field location; using the annotated image data, computing a first predicted yield for the agricultural field location; adjusting the first predicted yield by a scaling factor to produce a second predicted yield for the agricultural field location.

20 Claims, 9 Drawing Sheets

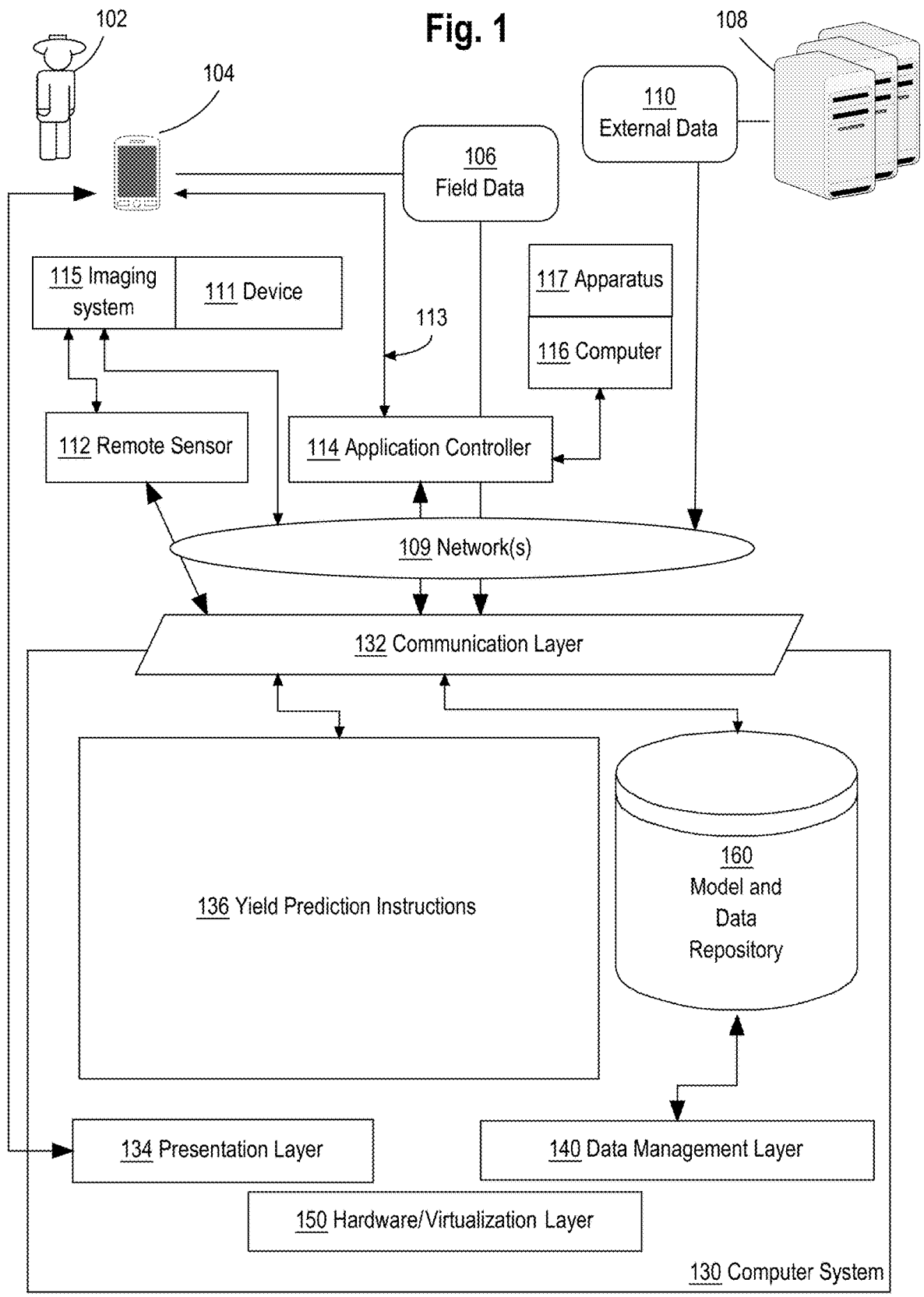

Fig. 2C

Data Manager

| Nitrogen | Planting | Practices | Soil |

Planting 1(4 Fields)  
Crop Corn Product  
Plant Date: 2016-04-12  
ILU 112 | Pop: 34000  
[Edit] [Apply]

Planting 2(0 Fields)  
Crop Corn Product  
Plant Date: 2016-04-15  
ILU 83 | Pop: 34000  
[Edit] [Apply]

Planting 3(0 Fields)  
Crop Corn Product  
Plant Date: 2016-04-13  
ILU 83 | Pop: 34000  
[Edit] [Apply]

Planting 4(1 Fields)  
Crop Corn Product  
Plant Date: 2016-04-13  
ILU 112 | Pop: 34000  
[Edit] [Apply]

+ Add New Planting Plan

| | CROP | PLANTED ACRES | PRODUCT | RELATIVE MATURITY | TARGET YIELD | POPULATION(AVG) | PLA |
|---|---|---|---|---|---|---|---|
| ☐ Select All | | | | | | | |
| ☐ Ames, IA 1<br>Corn \| 100 \| Boone, IA | Corn | — | DMC82-M | 112 | 160 | 34000 | Apr |
| ☐ Austin, MN 1<br>Corn \| 100 \| Fredricks, MN | Corn | — | DMC82-M | 114 | 160 | 36000 | Apr |
| ☐ Boone, IN 1<br>Corn \| 100 \| Boone, IA | Corn | — | DMC82-M | 112 | 150 | 34000 | Apr |
| ☐ Champaign 1<br>Corn \| 100 \| Champaign, IL | Corn | — | — | 112 | 200 | 34000 | Apr |
| ☐ E Nebraska 1<br>Corn \| 100 \| Burt, NE | Corn | — | — | 112 | 160 | 34000 | Apr |

Fig. 2D

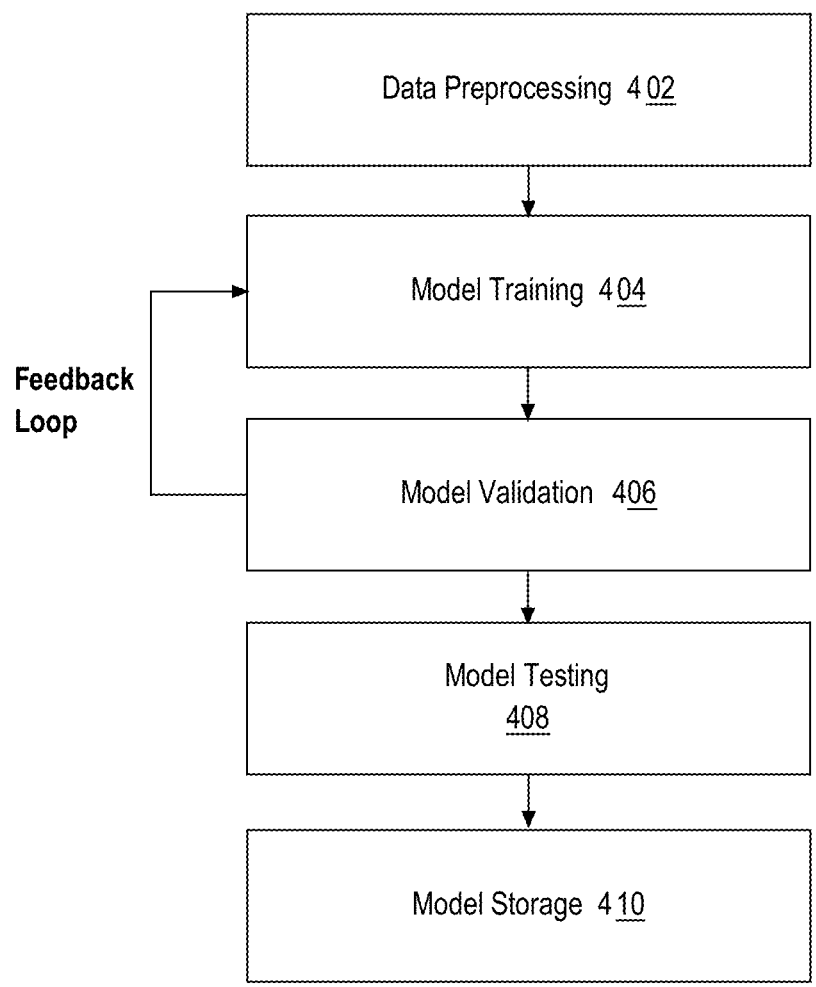

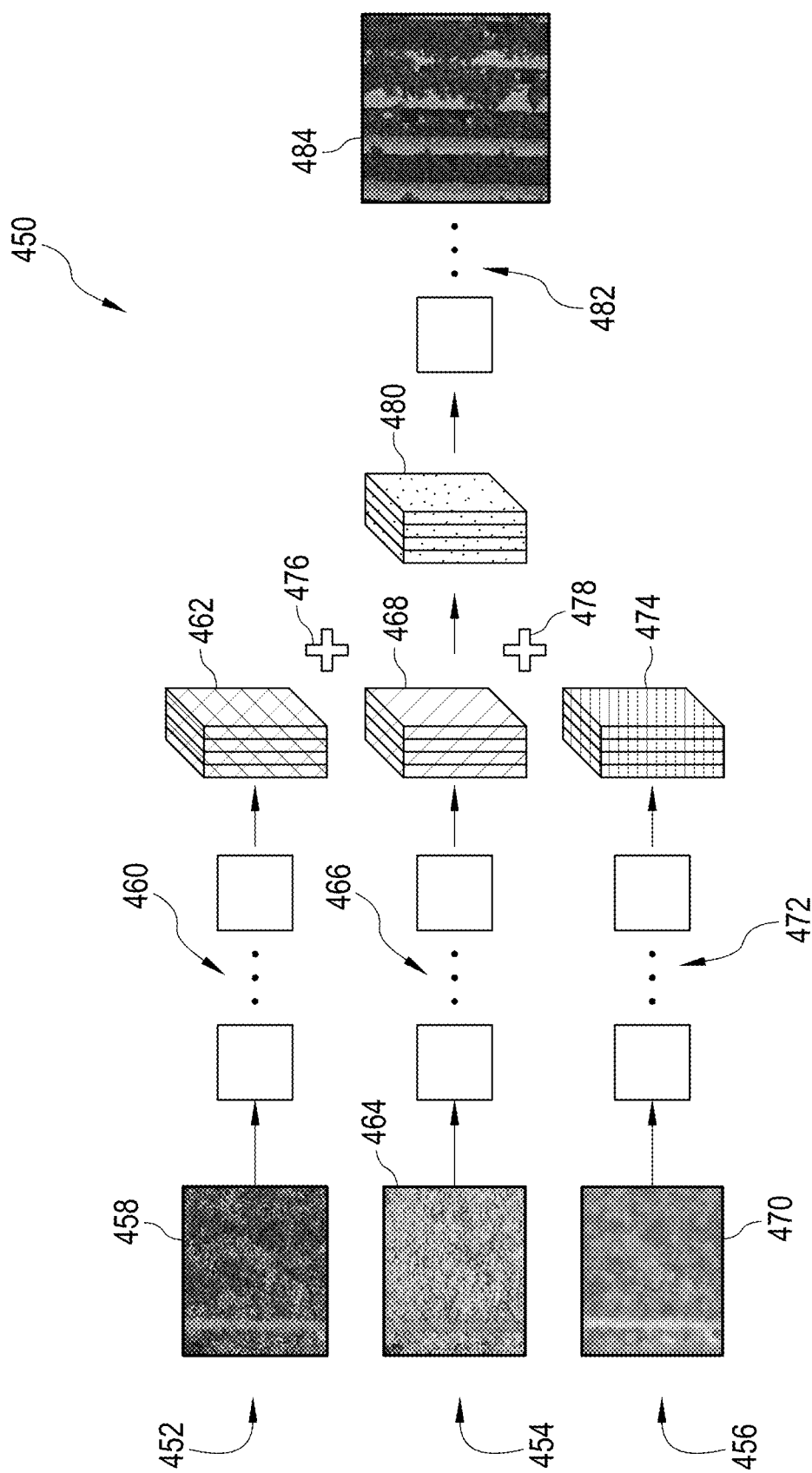

PREDICTING HORTICULTURAL YIELD FOR A FIELD LOCATION USING MULTI-BAND AERIAL IMAGERY

BENEFIT CLAIM

The present application claims the benefit under 35 U.S.C. § 119 of Provisional Application No. 63/052,939 filed Jul. 16, 2020, the entire contents of which are incorporated by reference as if fully set forth herein.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright or rights whatsoever. © 2015-2021 The Climate Corporation.

FIELD OF THE DISCLOSURE

The present disclosure relates to horticultural intelligence systems, and more particularly to technologies for predicting yield for horticultural operations.

BACKGROUND

For horticultural crops, it is difficult for computers to predict yield for a field location from aerial imagery. This is due to limitations of existing horticultural yield monitoring and harvesting technology, as well as typical physical characteristics of the horticultural crops. Melons, for example, are generally uniform in shape and color. Additionally, portions of the horticultural crops may be occluded by foliage, particularly in aerial views. These characteristics make it very challenging to use aerial imagery to obtain reliable yield information for horticultural crops.

The approaches described in this section are approaches that could be pursued, but not necessarily approaches that have been previously conceived or pursued. Therefore, unless otherwise indicated, it should not be assumed that any of the approaches described in this section qualify as prior art merely by their inclusion in this section.

SUMMARY

The appended claims may serve as a summary of the disclosure.

BRIEF DESCRIPTION OF THE DRAWINGS

In the drawings:

FIG. 1 illustrates an example computer system that is configured to perform the functions described herein, with portions shown in a field environment including other apparatus with which the system may interoperate.

FIG. 2C depicts an example embodiment of a timeline view for data entry.

FIG. 2D depicts an example embodiment of a spreadsheet view for data entry.

FIG. 4A, FIG. 4B, and FIG. 4C illustrate three flows of a programmed process by which the example computer system generates one or more pre-configured models using data provided by one or more data sources.

DETAILED DESCRIPTION

Figure 2A:
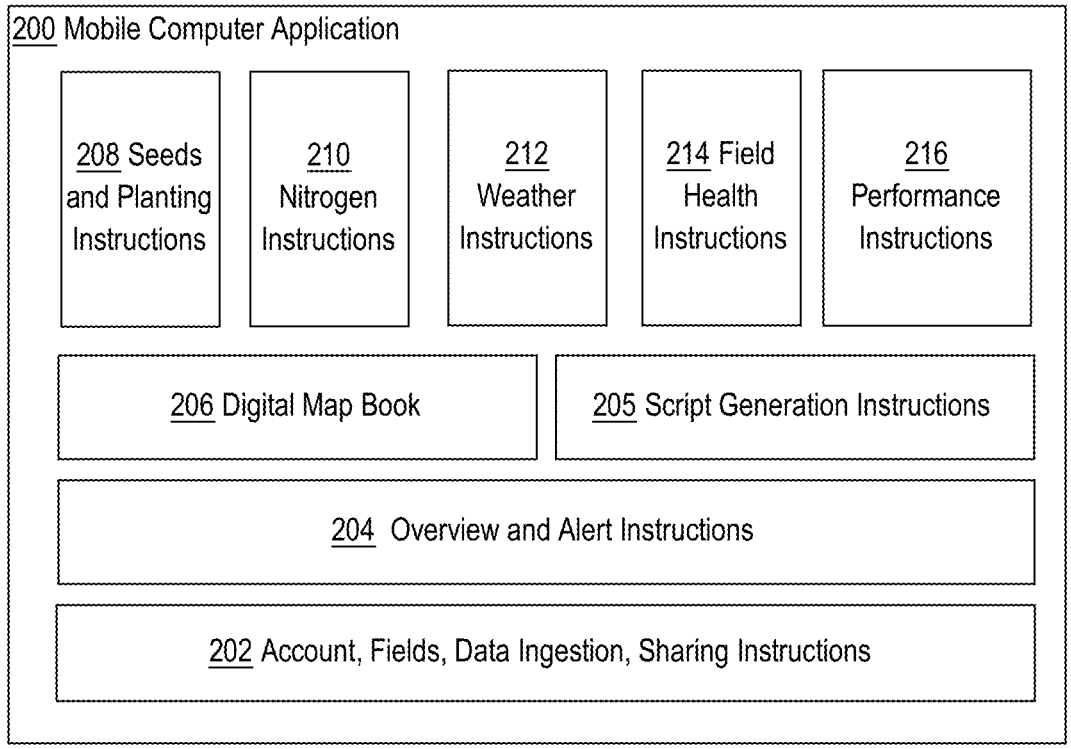
FIG. 2A and FIG. 2B illustrate two views of an example logical organization of sets of instructions in main memory when an example software application is loaded for execution.

In the following description, for the purposes of explanation, numerous specific details are set forth in order to provide a thorough understanding of the present disclosure. It will be apparent, however, that embodiments may be practiced without these specific details. In other instances, well-known structures and devices are shown in block diagram form to avoid unnecessarily obscuring the present disclosure. Embodiments are disclosed in sections according to the following outline:

1. GENERAL OVERVIEW
2. EXAMPLE COMPUTER SYSTEM
   2.1. STRUCTURAL OVERVIEW
   2.2. APPLICATION PROGRAM OVERVIEW
   2.3. HARDWARE OVERVIEW
3. EXAMPLE—YIELD PREDICTION MODEL
   3.1. MODEL CREATION
   3.2. DATA PRE-PROCESSING
   3.3. MODEL STRUCTURE
4. EXAMPLE—YIELD PREDICTION PROCESS
5. ADDITIONAL EXAMPLES
6. BENEFITS, EXTENSIONS AND ALTERNATIVES

1. GENERAL OVERVIEW

This disclosure describes technologies that enable yield information to be determined from aerial imagery of horticultural products. Using the disclosed technologies, yield predictions can be produced at various growth stages of horticultural products, including before or near harvest.

In an embodiment, a set of neural network-based models are created and combined to form a machine-learned classifier that can produce yield information from multi-band aerial imagery of horticultural products in a field location. The multi-band aerial imagery includes at least two different types of imagery that have been collected for the same field location on the same date and at the same time or within a particular period of time, such as an hour. In an embodiment, the different types of imagery include red-green-blue (RGB) imagery and thermal imagery, and may further include near-infrared (NIR) imagery. In an embodiment, the multi-band aerial imagery is captured by an unmanned aerial vehicle (UAV) flying over the field location.

As used herein, the multi-band aerial imagery may refer to imagery captured using multiple different sensors. For example, one or more RGB color sensors, one or more NIR sensors, and one or more thermal sensors. The one or more RGB color sensors detect the red, green, and blue color present in an object of interest (here, a field location containing horticultural product), so it produces imagery in three different bands (red, green, and blue). Thermal imagery as used herein may refer to imagery captured using one or more sensors that detect temperature of an object of interest (here, a field location containing horticultural product), typically by focusing the infrared energy emitted by the object onto one or more photodetectors of the sensor. Because the emitted infrared energy of any object is proportional to its temperature, the electrical signal provides an accurate reading of the temperature of the object that it is pointed at. NIR imagery may refer to imagery captured using one or more sensors that detects electromagnetic (EM) radiation at wavelengths in the range 780 to 2,500 nanometers (nm). An NIR image sensor generally includes a detector that measures transmittance and absorbance of the EM radiation in the NIR range when light interacts with a target object (here, a field location containing horticultural product).

The yield information generated from the aerial imagery by the disclosed technologies can be scaled as needed to produce yield prediction data. The yield prediction data can be output in a form of electronic communication that is capable of being used by a remote device to control a horticultural operation. For example, yield prediction data produced by the disclosed technologies may be used to determine or modify a route that a vehicle or other implement uses to traverse a field or cause the machine to follow a route that has been determined using the disclosed technologies. In an embodiment, yield prediction data includes predicted location points, such as longitude and latitude coordinates, centroid points, etc. which are used to generate navigation instructions of a ground vehicle moving through the field, such as a sprayer or a fertilizer applicator, or an aerial vehicle flying above the field, such as a drone. For instance, location points that represent regions predicted to have particularly low yield or particularly high yield may be transformed into waypoints of a route for a vehicle.

The vehicle route as determined or modified by the yield prediction data produced by the disclosed technologies is transmitted to a vehicle computer, such as a cab computer of a tractor pulling an implement or an embedded controller that controls operations of the implement, and the vehicle computer operates the implement along the route that has been determined or modified by the yield prediction data produced by the disclosed technologies.

In another embodiment, location points extracted from yield prediction data produced by the disclosed technologies, such as centroid points of data representing regions of very low predicted yield, are included in a route to be traversed by a sprayer or fertilizer, in order to improve efficiency of the operation by causing the vehicle to focus on very low predicted yield positions that may need an application of fertilizer or nutrient and avoid positions that are predicted to have a high yield.

Alternatively, or in addition, location points extracted from yield prediction data produced by the disclosed technologies may be used to control the speed at which a vehicle traverses a route through a field. For example, prior to harvest time, vehicle speed may be decreased through location points of very low predicted yield, and the vehicle speed may be increased through locations of high yield.

In these and other examples, the yield prediction data produced by the disclosed technologies is used to determine or modify one or more operating parameters of a vehicle or other implement. Examples of operating parameters include speed, direction, date/time of operation of a vehicle or implement operating in a field.

In some embodiments, yield prediction data produced by the disclosed technologies is used to define management zones and/or to determine a prescription for application of nutrients or fertilizer to a field. Examples of uses of yield data to produce management zones and fertilizer application rates are described in U.S. Pat. Nos. 10,398,096; 10,667,474; and US20160180473, each of which is incorporated herein by this reference.

Field as used herein may refer to a bounded tract of land, which may be defined by a set of acres. Field location as used herein may refer to a particular location or sub-area of a field. Product as used herein may refer to a horticultural product, such as a fruit or vegetable. Horticultural operation, as used herein, may refer to operations conducted on one or multiple fields, which may or may not be contiguous, in which horticultural products may be planted or harvested.

In an embodiment, a method comprises inputting, to a machine-learned classifier that has been created using a set of neural network-based models, multi-band digital image data that represents an aerial view of an agricultural field location containing a horticultural product, each neural network-based model of the set of neural network-based models comprising a plurality of layers, each layer of the plurality of layers comprising a plurality of nodes and a plurality of weights associated with the plurality of nodes; outputting, by the classifier, annotated image data, the annotated image data comprising annotation data identifying individual instances of the horticultural product in the agricultural field location; using the annotated image data, computing a first predicted yield for the agricultural field location.

2. EXAMPLE COMPUTER SYSTEM

2.1 Structural Overview

FIG. 1 illustrates an example computer system that is configured to perform the functions described herein, with a portion of the computer system shown in a field environment with other apparatus with which the system may interoperate. In one embodiment, a user 102 owns, operates, or possesses a computing device 104. The computing device 104 is programmed or configured to provide field data 106 and/or control signals to a computer system 130 and/or to receive field data 106 and/or control signals from computer system 130, via one or more networks 109.

Examples of field data 106 include (a) identification data (for example, acreage, field name, field identifiers, geographic identifiers, boundary identifiers, crop identifiers, and any other suitable data that may be used to identify farm land, such as a common land unit (CLU), lot and block number, a parcel number, geographic coordinates and boundaries, Farm Serial Number (FSN), farm number, tract number, field number, section, township, and/or range), (b) harvest data (for example, crop type, crop variety, crop rotation, whether the crop is grown organically, harvest date, Actual Production History (APH), expected yield, yield, crop price, crop revenue, grain moisture, tillage practice, and previous growing season information), (c) soil data (for example, type, composition, pH, organic matter (OM), cation exchange capacity (CEC)), (d) planting data (for example, planting date, seed(s) type, relative maturity (RM) of planted seed(s), seed population), (e) fertilizer data (for example, nutrient type (Nitrogen, Phosphorous, Potassium), application type, application date, amount, source, method), (f) chemical application data (for example, pesticide, herbicide, fungicide, other substance or mixture of substances intended for use as a plant regulator, defoliant, or desiccant, application date, amount, source, method), (g) irrigation data (for example, application date, amount, source, method), (h) weather data (for example, precipitation, rainfall rate, predicted rainfall, water runoff rate region, temperature, wind, forecast, pressure, visibility, clouds, heat index, dew point, humidity, snow depth, air quality, sunrise, sunset), (i) imagery data (for example, imagery and light spectrum information from an agricultural apparatus sensor, camera, computer, smartphone, tablet, unmanned aerial vehicle (UAV), planes or satellite), (j) scouting observations (photos, videos, free form notes, voice recordings, voice transcriptions, weather conditions (temperature, precipitation (current and over time), soil moisture, crop growth stage, wind velocity, relative humidity, dew point, black layer)), and (k) soil, seed, crop phenology, pest and disease reporting, and predictions sources and databases. In some embodiments, field data 106 includes imagery, such as still or video digital imagery. Field data 106 may include raw measured, detected, or sensed data values and/or data values that have been computed using raw data values, and may include estimates and predicted data values.

A data server computer 108 is communicatively coupled to computer system 130 and is programmed or configured to send external data 110 to computer system 130 via the network(s) 109. The data server computer 108 may be owned or operated by the same legal person or entity as the computer system 130, or by a different person or entity such as a government agency, non-governmental organization (NGO), and/or a private data service provider. Examples of external data include weather data, imagery data, soil data, or statistical data relating to crop yields, among others. External data 110 may consist of the same type of information as field data 106. In some embodiments, the external data 110 is provided by an external data server computer 108 owned by the same entity that owns and/or operates the computer system 130. For example, the computer system 130 may include a data server focused exclusively on a type of data that might otherwise be obtained from third party sources, such as weather data. In some embodiments, an external data server computer 108 may be incorporated within the system 130.

In an embodiment, external data server computer 108 stores external data 110, including soil data representing soil composition for the one or more fields and weather data representing temperature and precipitation on the one or more fields. The weather data may include past and present weather data as well as forecasts for future weather data. In an embodiment, external data server computer 108 comprises a plurality of servers hosted by different entities. For example, a first server may contain soil composition data while a second server may include weather data. Additionally, soil composition data may be stored in multiple servers. For example, one server may store data representing percentage of sand, silt, and clay in the soil while a second server may store data representing percentage of organic matter (OM) in the soil.

A device 111 may have one or more remote sensors 112 fixed thereon or coupled thereto, which sensors are communicatively coupled either directly or indirectly via device 111 to the computer system 130 and are programmed or configured to send sensor data to computer system 130. Examples of device 111 include tractors, combines, harvesters, planters, trucks, fertilizer equipment, aerial vehicles including unmanned aerial vehicles, and any other item of physical machinery or hardware, typically mobile machinery, and which may be used in tasks associated with horticultural operations. In some embodiments, a single unit of device 111 may comprise a plurality of sensors 112 that are coupled locally in a network on the apparatus; controller area network (CAN) is example of such a network that can be installed in combines, harvesters, sprayers, and cultivators.

In some embodiments, remote sensors 112 may not be fixed to a device 111 but may be remotely located in the field and may communicate with network 109. Sensor data may include the same type of information as field data 106.

The device 111 may include an imaging system 115. The imaging system 115 may be programmed or configured to receive, process, and store imagery data (for example, imagery and light spectrum information from the sensor(s) 112, camera, computer, smartphone, tablet, unmanned aerial vehicle, planes, or satellite). A portion of imaging system 115 may be located on device 111 and another portion of imaging system 115 may be located at a ground control site. Data communication between the two portions may be provided by a telemetry system including a digital data link established by the ground control site with the device 111. The digital data link and/or telemetry system may be programmed or configured for real-time data communication. In an embodiment, device 111 is an aerial vehicle, such as a UAV or "drone," and imaging system 115 is programmed or configured to produce and store multi-band imagery generated by a plurality of sensors 112. In an embodiment, the plurality of sensors that produce the multi-band imagery includes one or more red-green-blue (RGB) visible light sensors and/or one or more near-infrared (NIR) sensors and/or one or more thermal sensors.

In an embodiment, remote sensor 112 comprises one or more sensors that are programmed or configured to produce one or more observations. Remote sensor 112 may be aerial sensors, such as satellites, vehicle sensors, planting equipment sensors, tillage sensors, fertilizer or insecticide application sensors, harvester sensors, and any other implement capable of receiving data from one or more fields. In an embodiment, application controller 114 is programmed or configured to receive instructions from computer system 130. Application controller 114 may also be programmed or configured to control an operating parameter of an agricultural vehicle or implement. For example, an application controller 114 may be programmed or configured to control an operating parameter of a vehicle, such as a tractor, planting equipment, tillage equipment, fertilizer or insecticide equipment, harvester equipment, or other farm implements such as a water valve. Other embodiments may use any combination of sensors and controllers, of which the following are merely selected examples.

The system 130 may obtain or ingest data under user 102 control, on a mass basis from a large number of growers who have contributed data to a shared database system. This form of obtaining data may be termed "manual data ingest" as one or more user-controlled computer operations are requested or triggered to obtain data for use by the system 130. As an example, the CLIMATE FIELDVIEW application, commercially available from The Climate Corporation, San Francisco, California, may be operated to export data to system 130 for storing in the repository 160.

For example, yield monitor systems may contain yield sensors for harvester apparatus that send yield measurement data to the computer 116 or other devices within the system 130. Yield monitor systems may utilize one or more remote sensors 112 to obtain, for example, moisture measurements in a combine or other harvester and transmit these measurements to the user via the computer 116 or other devices within the system 130.

In an embodiment, examples of sensors 112 that may be used with any moving vehicle or apparatus of the type described elsewhere herein include kinematic sensors and position sensors. Kinematic sensors may comprise any of speed sensors such as radar or wheel speed sensors, accelerometers, or gyros. Position sensors may comprise GPS receivers or transceivers, or Wi-Fi-based position or mapping apps that are programmed to determine location based upon nearby Wi-Fi hotspots, among others.

In an embodiment, examples of sensors 112 that may be used with tractors or other moving vehicles include engine speed sensors, fuel consumption sensors, area counters or distance counters that interact with GPS or radar signals, PTO (power take-off) speed sensors, tractor hydraulics sensors configured to detect hydraulics parameters such as pressure or flow, and/or and hydraulic pump speed, wheel speed sensors or wheel slippage sensors. In an embodiment, examples of controllers 114 that may be used with tractors include hydraulic directional controllers, pressure controllers, and/or flow controllers; hydraulic pump speed controllers; speed controllers or governors; hitch position controllers; or wheel position controllers provide automatic steering.

In an embodiment, examples of sensors 112 that may be used with seed planting equipment such as planters, drills, or air seeders include seed sensors, which may be optical, electromagnetic, or impact sensors; downforce sensors such as load pins, load cells, pressure sensors; soil property sensors such as reflectivity sensors, moisture sensors, electrical conductivity sensors, optical residue sensors, or temperature sensors; component operating criteria sensors such as planting depth sensors, downforce cylinder pressure sensors, seed disc speed sensors, seed drive motor encoders, seed conveyor system speed sensors, or vacuum level sensors; or pesticide application sensors such as optical or other electromagnetic sensors, or impact sensors. In an embodiment, examples of controllers 114 that may be used with such seed planting equipment include: toolbar fold controllers, such as controllers for valves associated with hydraulic cylinders; downforce controllers, such as controllers for valves associated with pneumatic cylinders, airbags, or hydraulic cylinders, and programmed for applying downforce to individual row units or an entire planter frame; planting depth controllers, such as linear actuators; metering controllers, such as electric seed meter drive motors, hydraulic seed meter drive motors, or swath control clutches; hybrid selection controllers, such as seed meter drive motors, or other actuators programmed for selectively allowing or preventing seed or an air-seed mixture from delivering seed to or from seed meters or central bulk hoppers; metering controllers, such as electric seed meter drive motors, or hydraulic seed meter drive motors; seed conveyor system controllers, such as controllers for a belt seed delivery conveyor motor; marker controllers, such as a controller for a pneumatic or hydraulic actuator; or pesticide application rate controllers, such as metering drive controllers, orifice size or position controllers.

In an embodiment, examples of sensors 112 that may be used with tillage equipment include position sensors for tools such as shanks or discs; tool position sensors for such tools that are configured to detect depth, gang angle, or lateral spacing; downforce sensors; or draft force sensors. In an embodiment, examples of controllers 114 that may be used with tillage equipment include downforce controllers or tool position controllers, such as controllers configured to control tool depth, gang angle, or lateral spacing.

In an embodiment, examples of sensors 112 that may be used in relation to apparatus for applying fertilizer, insecticide, fungicide and the like, such as on-planter starter fertilizer systems, subsoil fertilizer applicators, or fertilizer sprayers, include: fluid system criteria sensors, such as flow sensors or pressure sensors; sensors indicating which spray head valves or fluid line valves are open; sensors associated with tanks, such as fill level sensors; sectional or system-wide supply line sensors, or row-specific supply line sensors; or kinematic sensors such as accelerometers disposed on sprayer booms. In an embodiment, examples of controllers 114 that may be used with such apparatus include pump speed controllers; valve controllers that are programmed to control pressure, flow, direction, PWM and the like; or position actuators, such as for boom height, subsoiler depth, or boom position.

In an embodiment, examples of sensors 112 that may be used with harvesters include yield monitors, such as impact plate strain gauges or position sensors, capacitive flow sensors, load sensors, weight sensors, or torque sensors associated with elevators or augers, or optical or other electromagnetic grain height sensors; grain moisture sensors, such as capacitive sensors; grain loss sensors, including impact, optical, or capacitive sensors; header operating criteria sensors such as header height, header type, deck plate gap, feeder speed, and reel speed sensors; separator operating criteria sensors, such as concave clearance, rotor speed, shoe clearance, or chaffer clearance sensors; auger sensors for position, operation, or speed; or engine speed sensors. In an embodiment, examples of controllers 114 that may be used with harvesters include header operating criteria controllers for elements such as header height, header type, deck plate gap, feeder speed, or reel speed; separator operating criteria controllers for features such as concave clearance, rotor speed, shoe clearance, or chaffer clearance; or controllers for auger position, operation, or speed.

In an embodiment, examples of sensors 112 that may be used with grain carts include weight sensors, or sensors for auger position, operation, or speed. In an embodiment, examples of controllers 114 that may be used with grain carts include controllers for auger position, operation, or speed.

In an embodiment, examples of sensors 112 and controllers 114 may be installed in unmanned aerial vehicle (UAV) apparatus or "drones." Such sensors may include cameras with detectors effective for any range of the electromagnetic spectrum including visible light, infrared, ultraviolet, near-infrared (NIR), and the like; accelerometers; altimeters; temperature sensors; humidity sensors; pitot tube sensors or other airspeed or wind velocity sensors; battery life sensors; or radar emitters and reflected radar energy detection apparatus; other electromagnetic radiation emitters and reflected electromagnetic radiation detection apparatus. Such controllers may include guidance or motor control apparatus, control surface controllers, camera controllers, or controllers programmed to turn on, operate, obtain data from, manage, and configure any of the foregoing sensors. Some embodiments may use portions of the technologies for designing an area for aerial imaging that are described in, for example, U.S. Pat. No. 10,346,958, which is incorporated herein by this reference.

An apparatus 117 may include one or more tractors, combines, harvesters, planters, trucks, fertilizer equipment, aerial vehicles including unmanned aerial vehicles, and any other item of physical machinery or hardware, typically mobile machinery, and which may be used in tasks associated with horticulture and/or other farming operations. The apparatus 117 may comprise or be coupled to a computer 116 that is programmed with a software application, which may comprise a version or variant of the software application for device 104 that is further described in other sections herein. In an embodiment, computer 116 comprises a compact computer, often a tablet-sized computer or smartphone, with a graphical screen display, such as a color display, that is mounted within an operator's cab of the apparatus 117. Computer 116 may implement some or all of the operations and functions that are described further herein for the computing device 104.

Application controller 114 is communicatively coupled to computer system 130 via the network(s) 109 and is programmed or configured to receive one or more scripts that are used to control an operating parameter of a device, vehicle or implement, such as computing device 104, apparatus 117 or device 111, from the computer system 130. For example, one or more scripts containing yield prediction data are used to control an operating parameter of a device, vehicle or implement, such as computing device 104, apparatus 117 or device 111. An adjustment of an operating parameter based on yield prediction data determined using the disclosed technologies and communicated to a device, vehicle or implement by one or more scripts causes the device, vehicle or implement to, for example, change direction, increase or decrease speed, increase or decrease application rate of a nutrient, or change the boundaries of a management zone, while traversing a field. Operating parameter adjustments corresponding to particular values of yield prediction data may be pre-determined and stored in, for example, a look-up table or database.

A controller area network (CAN) bus interface may be used to enable communications from the computer system 130 to the computer 116 via the network(s) 109. The network(s) 109 may be used to enable communications from the imaging system 115 to the computer system 130, from the computer system 130 to the imaging system 115, from the computer system 130 to the computing device 104, from the computing device 104 to the computer system 130.

The network(s) 109 broadly represents any combination of one or more data communication networks including local area networks, wide area networks, internetworks, or internets, using any of wireline or wireless links, including terrestrial or satellite links. The network(s) may be implemented by any medium or mechanism that provides for the exchange of data between the various elements of FIG. 1. The various elements of FIG. 1 may also have direct (wired or wireless) communications links. The sensors 112, controller 114, external data server computer 108, and other elements of the system each comprise an interface compatible with the network(s) 109 and are programmed or configured to use standardized protocols for communication across the networks such as TCP/IP, Bluetooth, CAN protocol and higher-layer protocols such as HTTP, TLS, and the like.

Computer system 130 is programmed or configured to receive field data 106 from computing device 104, external data 110 from external data server computer 108, sensor data from remote sensor 112, and/or imagery data from imaging system 115. Computer system 130 may be further configured to host, use or execute one or more computer programs, other software elements, digitally programmed logic such as FPGAs or ASICs, or any combination thereof to perform translation and storage of data values, construction of digital models of one or more crops on one or more fields, generation of recommendations and notifications, and generation and sending of scripts to application controller 114, in the manner described further in other sections of this disclosure.

In an embodiment, computer system 130 is programmed with or comprises a communication layer 132, a presentation layer 134, a data management layer 140, a hardware/virtualization layer 150, and a model and field data repository 160. "Layer," in this context, refers to any combination of computer hardware and/or software, such as electronic digital interface circuits, microcontrollers, firmware such as drivers, and/or computer programs or other software elements.

Communication layer 132 may be programmed or configured to perform input/output interfacing functions including sending requests to computing device 104, computer 116, imaging system 115, external data server computer 108, and remote sensor 112 for field data, external data, and/or sensor data. Communication layer 132 may be programmed or configured to send the received data to model and field data repository 160 to be stored as field data 106.

Presentation layer 134 may be programmed or configured to generate a graphical user interface (GUI) to be displayed on computing device 104, computer 116 or other computers that are coupled to the system 130 through the network(s) 109. The GUI may comprise controls for inputting data to be sent to computer system 130, generating requests for models and/or recommendations, and/or displaying recommendations, notifications, models, and other field data.

Data management layer 140 may be programmed or configured to manage read operations and write operations involving the model and repository 160 and other functional elements of the system, including queries and result sets communicated between the functional elements of the system and the repository. Examples of data management layer 140 include JDBC, SQL server interface code, and/or HADOOP interface code, among others. Repository 160 may comprise a database; for example, a database in which model parameters and weights are stored. As used herein, the term "database" may refer to either a body of data, a relational database management system (RDBMS), or to both. As used herein, a database may comprise any collection of data including hierarchical databases, relational databases, flat file databases, object-relational databases, object oriented databases, distributed databases, and any other structured collection of records or data that is stored in a computer system. Examples of RDBMS's include, but are not limited to, ORACLE®, MYSQL, IBM® DB2, MICROSOFT® SQL SERVER, SYBASE®, and POSTGRESQL databases. However, any database may be used that enables the systems and methods described herein.

When field data 106 is not provided directly to the computer system 130 via a device 111, remote sensor 112, computing device 104, or computer 116, the user may be prompted via one or more user interfaces on the user device (served by the computer system 130) to input such information. In an example embodiment, the user may specify identification data by accessing a map on the user device (served by the computer system 130) and selecting specific common land units (CLUs) or contiguous farming parcels that have been graphically shown on the map. In an alternative embodiment, the user 102 may specify identification data by accessing a map on the user device (served by the computer system 130) and drawing boundaries of the field over the map. Such CLU selection or map drawings represent geographic identifiers. In alternative embodiments, the user may specify identification data by accessing field identification data (provided as shape files or in a similar format) from the U.S. Department of Agriculture Farm Service Agency or other source via the user device and providing such field identification data to the computer system 130.

In an example embodiment, the computer system 130 is programmed to generate and cause displaying a graphical user interface comprising a data manager for data input.

After one or more fields have been identified using the methods described above, the data manager may provide one or more graphical user interface widgets which when selected can identify changes to the field, soil, crops, tillage, or nutrient practices. The data manager may include a timeline view, a spreadsheet view, and/or one or more editable programs.

In an embodiment, yield prediction instructions 136 comprises a set of one or more pages of main memory, such as RAM, in the computer system 130 into which executable instructions have been loaded and which when executed cause the computing system 130 to perform the functions or operations that are described herein with reference to those instructions. For example, yield prediction instructions 136 may comprise a set of pages in RAM that contain instructions which when executed cause performing the yield prediction functions that are described herein with reference to FIGS. 4 and 5. The instructions may be in machine executable code in the instruction set of a CPU and may have been compiled based upon source code written in JAVA, C, C++, OBJECTIVE-C, or any other human-readable programming language or environment, alone or in combination with scripts in JAVASCRIPT, other scripting languages and other programming source text. The term "pages" is intended to refer broadly to any region within main memory and the specific terminology used in a system may vary depending on the memory architecture or processor architecture. In another embodiment, yield prediction instructions 136 also may represent one or more files or projects of source code that are digitally stored in a mass storage device such as non-volatile RAM or disk storage, in the computer system 130 or a separate repository system, which when compiled or interpreted cause generating executable instructions which when executed cause the agricultural intelligence computing system to perform the functions or operations that are described herein with reference to those modules. In other words, the drawing figures may represent the manner in which programmers or software developers organize and arrange source code for later compilation into an executable, or interpretation into byte-code or the equivalent, for execution by the computer system 130.

Figure 4B:
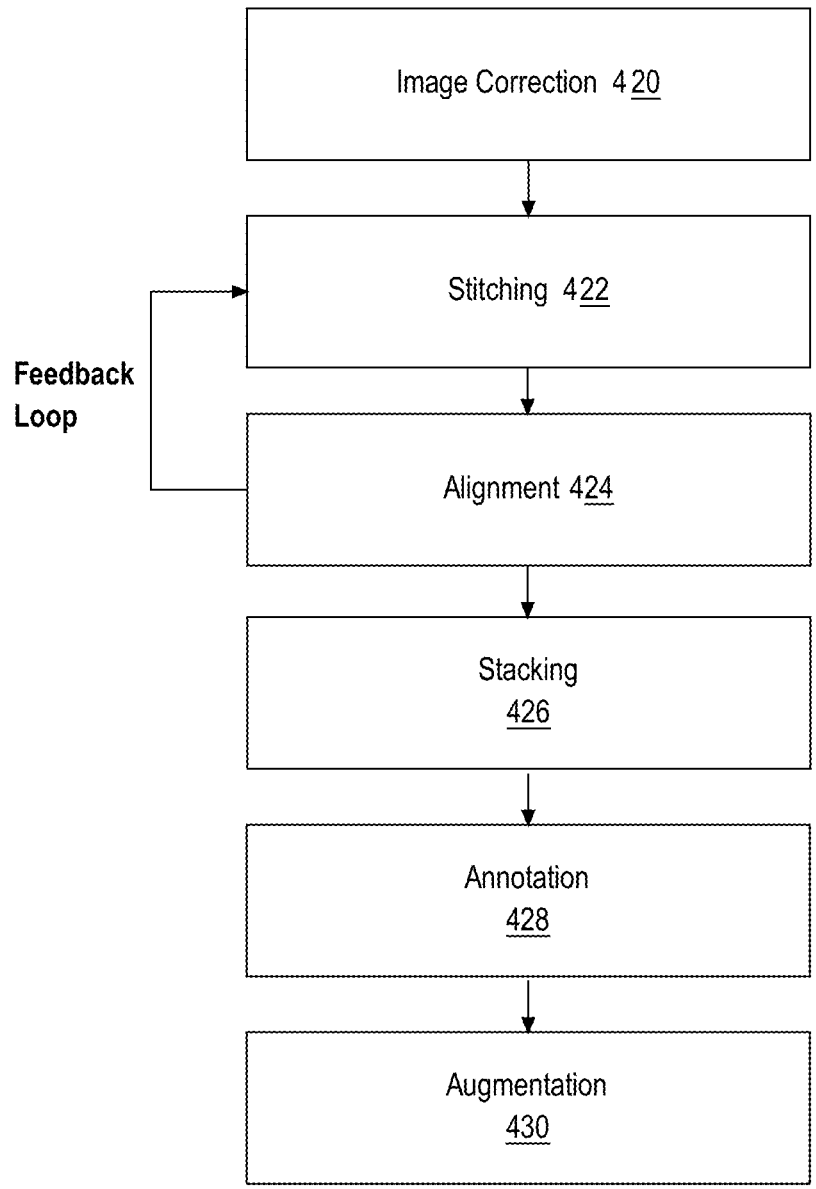

Hardware/virtualization layer 150 comprises one or more central processing units (CPUs), memory controllers, and other devices, components, or elements of a computer system such as volatile or non-volatile memory, non-volatile storage such as disPlk, and I/O devices or interfaces as illustrated and described, for example, in connection with FIG. 4A, FIG. 4B, and FIG. 4C. The layer 150 also may comprise programmed instructions that are configured to support virtualization, containerization, or other technologies.

For purposes of illustrating a clear example, FIG. 1 shows a limited number of instances of certain functional elements. However, in other embodiments, there may be any number of such elements. For example, embodiments may use thousands or millions of different computing devices 104 associated with different users. Further, the system 130 and/or external data server computer 108 may be implemented using two or more processors, cores, clusters, or instances of physical machines or virtual machines, configured in a discrete location, or co-located with other elements in a datacenter, shared computing facility or cloud computing facility.

2.2. Application Program Overview

In an embodiment, the implementation of the functions described herein using one or more computer programs or other software elements that are loaded into and executed using one or more general-purpose computers will cause the general-purpose computers to be configured as a particular machine or as a computer that is specially adapted to perform the functions described herein. Further, each of the flow diagrams that are described further herein may serve, alone or in combination with the descriptions of processes and functions in prose herein, as instructions, plans or directions that may be used to program a computer or logic to implement the functions that are described. In other words, all the prose text herein, and all the drawing figures, together are intended to provide disclosure of instructions, plans or directions that are sufficient to permit a skilled person to program a computer to perform the functions that are described herein, in combination with the skill and knowledge of such a person given the level of skill that is appropriate for inventions and disclosures of this type.

In an embodiment, user 102 interacts with computer system 130 using computing device 104 configured with an operating system and one or more application programs or apps; the computing device 104 also may interoperate with the computer system 130 independently and automatically under program control or logical control and direct user interaction is not always required. Computing device 104 broadly represents one or more of a smart phone, PDA, tablet computing device, laptop computer, desktop computer, workstation, or any other computing device capable of transmitting and receiving information and performing the functions described herein. Computing device 104 may communicate via a network using a software application, such as a mobile device application, stored on computing device 104, and in some embodiments, the device may be coupled using a cable 113 or connector to a sensor 112 and/or application controller 114. A particular user 102 may own, operate, or possess and use, in connection with system 130, more than one computing device 104 at a time.

The software application may provide client-side functionality, via the network to one or more mobile computing devices. In an example embodiment, computing device 104 may access the mobile application via a web browser or a local client application or app. Computing device 104 may transmit data to, and receive data from, one or more front-end servers, using web-based protocols or formats such as HTTP, XML, and/or JSON, or app-specific protocols. In an example embodiment, the data may take the form of requests and user information input, such as field data, into the mobile computing device. In some embodiments, the mobile application interacts with location tracking hardware and software on computing device 104 which determines the location of computing device 104 using standard tracking techniques such as multilateration of radio signals, the global positioning system (GPS), WiFi positioning systems, or other methods of mobile positioning. In some cases, location data or other data associated with the device 104, user 102, and/or user account(s) may be obtained by queries to an operating system of the device or by requesting an app on the device to obtain data from the operating system.

In an embodiment, computing device 104 sends field data 106 to computer system 130 comprising or including, but not limited to, data values representing one or more of: a geographical location of the one or more fields, tillage information for the one or more fields, imagery data and/or other data relating to crops planted in the one or more fields, and soil data extracted from the one or more fields. Computing device 104 may send field data 106 in response to user input from user 102 specifying the data values for the one or more fields. Additionally, computing device 104 may automatically send field data 106 when one or more of the data values becomes available to computing device 104. For example, computing device 104 may be communicatively coupled to imaging system 115 or remote sensor 112 and/or application controller 114. In response to receiving data indicating that application controller 114 has caused imaging system 115 to collect imagery data of a field location, computing device 104 may send field data 106 including the imagery data for one or more field locations to computing system 130. Field data 106 identified in this disclosure may be input and communicated using electronic digital data that is communicated between computing devices using parameterized URLs over HTTP, or another suitable communication or messaging protocol. Portions of the description of the software application with respect to operations of computing device 104 are alternatively or in addition applicable to computer 116 and/or portions of imaging system 115.

A commercial example of a software application portions of which may be implemented on computing device 104 or computer 116 is CLIMATE FIELDVIEW, commercially available from The Climate Corporation, San Francisco, California. The CLIMATE FIELDVIEW application, or other applications, may be modified, extended, or adapted to include features, functions, and programming that have not been disclosed earlier than the filing date of this disclosure. In one embodiment, the software application comprises an integrated software platform that allows a user, such as a grower, to make fact-based decisions for a horticultural operation because it combines historical data about the grower's fields with any other data that the grower wishes to compare. The combinations and comparisons may be performed in real-time and are based upon scientific models that provide potential scenarios to permit the grower to make better, more informed decisions.

Figure 2B:
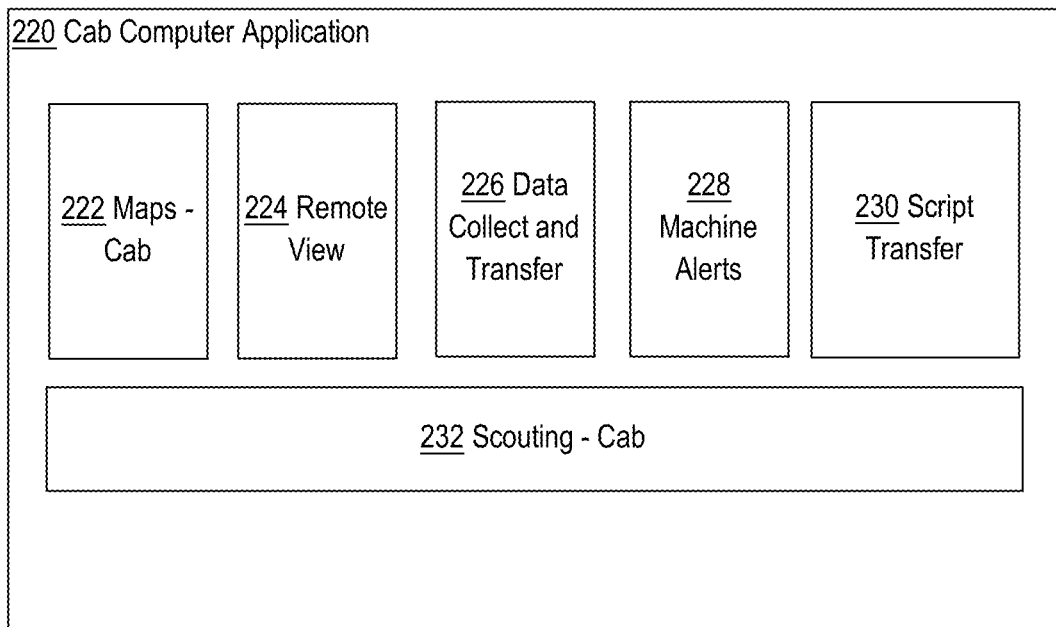

FIG. 2A and FIG. 2B illustrate two views of an example logical organization of sets of instructions in main memory when an example mobile application is loaded for execution. In FIG. 2A and FIG. 2B, each named element represents a region of one or more pages of RAM or other main memory, or one or more blocks of disk storage or other non-volatile storage, and the programmed instructions within those regions. In one embodiment, in FIG. 2A, a mobile computer application 200 comprises account-fields-data ingestion-sharing instructions 202, overview and alert instructions 204, digital map book instructions 206, seeds and planting instructions 208, nitrogen instructions 210, weather instructions 212, field health instructions 214, and performance instructions 216.

In one embodiment, a mobile computer application 200 comprises account, fields, data ingestion, sharing instructions 202 which are programmed to receive, translate, and ingest field data from sensors 112, imaging system 115, external data 110, or third party systems via manual upload or APIs. Data types may include field boundaries, yield maps, as-planted maps, soil test results, as-applied maps, and/or management zones, among others. Data formats may include shape files, native data formats of third parties, image files, and/or farm management information system (FMIS) exports, among others. Receiving data may occur via manual upload, e-mail with attachment, external APIs that push data to the mobile application, or instructions that call APIs of external systems to pull data into the mobile application. In one embodiment, mobile computer application 200 comprises a data inbox. In response to receiving a selection of the data inbox, the mobile computer application 200 may display a graphical user interface for manually uploading data files and importing uploaded files to a data manager.

In one embodiment, digital map book instructions 206 comprise field map data layers stored in device memory and are programmed with data visualization tools and geospatial field notes. This provides users with convenient information close at hand for reference, logging, and visual insights into field performance. In one embodiment, overview and alert instructions 204 are programmed to provide an operation-wide view of what is important to the user, and timely recommendations to take action or focus on particular issues. This permits the user to focus time on what needs attention, to save time and preserve yield throughout the season. In one embodiment, seeds and planting instructions 208 are programmed to provide tools for seed selection, hybrid placement, harvesting, and script creation, including variable rate (VR) script creation, based upon scientific models and empirical data. This enables growers to maximize yield or return on investment through optimized seed purchase, placement, population, and harvesting.

In one embodiment, script generation instructions 205 are programmed to provide an interface for generating scripts, including variable rate (VR) fertility scripts. The interface enables users to create scripts for field implements, such as nutrient applications, planting, harvesting, and irrigation. For example, a planting script interface may comprise tools for identifying a type of seed for planting. Upon receiving a selection of the seed type, mobile computer application 200 may display one or more fields broken into management zones, such as the field map data layers created as part of digital map book instructions 206. In one embodiment, the management zones comprise soil zones along with a panel identifying each soil zone and a soil name, texture, drainage for each zone, or other field data.

Mobile computer application 200 may also display tools for editing or creating such, such as graphical tools for drawing management zones, such as soil zones, over a map of one or more fields. Planting procedures may be applied to all management zones or different planting procedures may be applied to different subsets of management zones. When a script is created, mobile computer application 200 may make the script available for download in a format readable by an application controller, such as an archived or compressed format. Additionally, and/or alternatively, a script may be sent directly to computer 116 from mobile computer application 200 and/or uploaded to one or more data servers and stored for further use.

In one embodiment, nitrogen instructions 210 are programmed to provide tools to inform nitrogen decisions by visualizing the availability of nitrogen to crops. This enables growers to maximize yield or return on investment through optimized nitrogen application during the season. Example programmed functions include displaying images such as SSURGO images to enable drawing of fertilizer application zones and/or images generated from subfield soil data, such as data obtained from sensors, at a high spatial resolution (as fine as millimeters or smaller depending on sensor proximity and resolution); upload of existing grower-defined zones; providing a graph of plant nutrient availability and/or a map to enable tuning application(s) of nitrogen across multiple zones; output of scripts to drive machinery; tools for mass data entry and adjustment; and/or maps for data visualization, among others. "Mass data entry," in this context, may mean entering data once and then applying the same data to multiple fields and/or zones that have been defined in the system; example data may include nitrogen application data that is the same for many fields and/or zones of the same grower, but such mass data entry applies to the entry of any type of field data into the mobile computer application 200. For example, nitrogen instructions 210 may be programmed to accept definitions of nitrogen application and practice programs and to accept user input specifying to apply those programs across multiple fields. "Nitrogen application programs," in this context, refers to stored, named sets of data that associates: a name, color code or another identifier, one or more dates of application, types of material or product for each of the dates and amounts, method of application or incorporation such as injected or broadcast, and/or amounts or rates of application for each of the dates, crop or hybrid that is the subject of the application, among others. "Nitrogen practices programs," in this context, refer to stored, named sets of data that associates: a practices name; a previous crop; a tillage system; a date of primary tillage; one or more previous tillage systems that were used; one or more indicators of application type, such as manure, that were used. Nitrogen instructions 210 also may be programmed to generate and cause displaying a nitrogen graph, which indicates projections of plant use of the specified nitrogen and whether a surplus or shortfall is predicted; in some embodiments, different color indicators may signal a magnitude of surplus or magnitude of shortfall. In one embodiment, a nitrogen graph comprises a graphical display in a computer display device comprising a plurality of rows, each row associated with and identifying a field; data specifying what crop is planted in the field, the field size, the field location, and a graphic representation of the field perimeter; in each row, a timeline by month with graphic indicators specifying each nitrogen application and amount at points correlated to month names; and numeric and/or colored indicators of surplus or shortfall, in which color indicates magnitude.

In one embodiment, the nitrogen graph may include one or more user input features, such as dials or slider bars, to dynamically change the nitrogen planting and practices programs so that a user may optimize his nitrogen graph. The user may then use his optimized nitrogen graph and the related nitrogen planting and practices programs to implement one or more scripts, including variable rate (VR) fertility scripts. Nitrogen instructions 210 also may be programmed to generate and cause displaying a nitrogen map, which indicates projections of plant use of the specified nitrogen and whether a surplus or shortfall is predicted; in some embodiments, different color indicators may signal a magnitude of surplus or magnitude of shortfall. The nitrogen map may display projections of plant use of the specified nitrogen and whether a surplus or shortfall is predicted for different times in the past and the future (such as daily, weekly, monthly, or yearly) using numeric and/or colored indicators of surplus or shortfall, in which color indicates magnitude. In one embodiment, the nitrogen map may include one or more user input features, such as dials or slider bars, to dynamically change the nitrogen planting and practices programs so that a user may optimize his nitrogen map, such as to obtain a preferred amount of surplus to shortfall. The user may then use his optimized nitrogen map and the related nitrogen planting and practices programs to implement one or more scripts, including variable rate (VR) fertility scripts. In other embodiments, similar instructions to the nitrogen instructions 210 could be used for the application of other nutrients (such as phosphorus and potassium), application of pesticide, and irrigation programs.

In one embodiment, weather instructions 212 are programmed to provide field-specific recent weather data and forecasted weather information. This enables growers to save time and have an efficient integrated display with respect to daily operational decisions.

In one embodiment, field health instructions 214 are programmed to provide timely remote sensing images highlighting in-season crop variation and potential concerns. Example programmed functions include cloud checking, to identify possible clouds or cloud shadows; determining nitrogen indices based on field images; graphical visualization of scouting layers, including, for example, those related to field health, and viewing and/or sharing of scouting notes; downloading satellite images from multiple sources and prioritizing the images for the grower, graphical visualization of field locations including yield predictions generated from aerial imagery, among others. For example, field health instructions 214 may be programmed to provide pre-harvest recommendations or harvesting recommendations based on yield predictions produced from aerial imagery by yield prediction instructions 136.

In one embodiment, performance instructions 216 are programmed to provide reports, analysis, and insight tools using on-farm data for evaluation, insights, and decisions. This enables the grower to seek improved outcomes for the next year through fact-based conclusions about why return on investment was at prior levels, and insight into yield-limiting factors. The performance instructions 216 may be programmed to communicate via the network(s) 109 to back-end analytics programs executed at computer system 130 and/or external data server computer 108 and configured to analyze metrics such as yield, yield differential, hybrid, population, SSURGO zone, soil test properties, or elevation, among others. Programmed reports and analysis may include yield variability analysis, treatment effect estimation, benchmarking of yield and other metrics against other growers based on anonymized data collected from many growers, or data for seeds, planting, or harvesting, among others.

Applications having instructions configured in this way may be implemented for different computing device platforms while retaining the same general user interface appearance. For example, the mobile application may be programmed for execution on tablets, smartphones, or server computers that are accessed using browsers at client computers. Further, the mobile application as configured for tablet computers or smartphones may provide a full app experience or a cab app experience that is suitable for the display and processing capabilities of computer 116.

For example, referring now to FIG. 2B, in one embodiment a cab computer application 220 may comprise maps-cab instructions 222, remote view instructions 224, data collect and transfer instructions 226, machine alerts instructions 228, script transfer instructions 230, and scouting-cab instructions 232. The codebase for the instructions of FIG. 2B may be the same as for FIG. 2A and executables implementing the code may be programmed to detect the type of platform on which they are executing and to expose, through a graphical user interface, only those functions that are appropriate to a cab platform or full platform. This approach enables the system to recognize the distinctly different user experience that is appropriate for an in-cab environment and the different technology environment of the cab. The maps-cab instructions 222 may be programmed to provide map views of fields, farms, or regions that are useful in directing machine operation. The remote view instructions 224 may be programmed to turn on, manage, and provide views of machine activity in real-time or near real-time to other computing devices connected to the system 130 via wireless networks, wired connectors or adapters, and the like. The data collect and transfer instructions 226 may be programmed to turn on, manage, and provide transfer of data collected at sensors and controllers to the system 130 via wireless networks, wired connectors or adapters, and the like. The machine alerts instructions 228 may be programmed to detect issues with operations of the machine or tools that are associated with the cab and generate operator alerts. The script transfer instructions 230 may be configured to transfer in scripts of instructions that are configured to direct machine operations or the collection of data. The scouting-cab instructions 232 may be programmed to display location-based alerts and information received from the system 130 based on the location of the computing device 104, device 111, computer 116, or sensors 112 in the field and ingest, manage, and provide transfer of location-based scouting observations to the system 130 based on the location of the device 111 or sensors 112 in the field. In an embodiment, maps-cab instructions 222 may be programmed to provide map views of field locations that have been generated using aerial imagery produced by imaging system 115; remote view instructions 224 may be programmed to turn on, manage, and provide views of activity of the device 111 in real-time or near real-time to other computing devices connected to the system 130 via wireless networks, wired connectors or adapters, and the like; data collect and transfer instructions 226 may be programmed to turn on, manage, and provide transfer of data collected at sensors 112 or imaging system 115 to the system 130 via wireless networks, wired connectors or adapters, and the like; machine alerts instructions 228 may be programmed to detect issues with operations of the device 111 or other machine or tools and generate operator alerts; script transfer instructions 230 may be configured to transfer in scripts of instructions that are configured to direct operations of device 111 or the collection of data by imaging system 115; scouting-cab instructions 232 may be programmed to display location-based alerts and information received from the system 130 including yield prediction data produced by yield prediction instructions 136 for particular field locations, based on the location of the computing device 104, device 111, computer 116, or sensors 112 in the field and ingest, manage, and provide transfer of location-based yield prediction data to the system 130 based on the location of the device 111 or sensors 112 in the field.

Figure 2C:
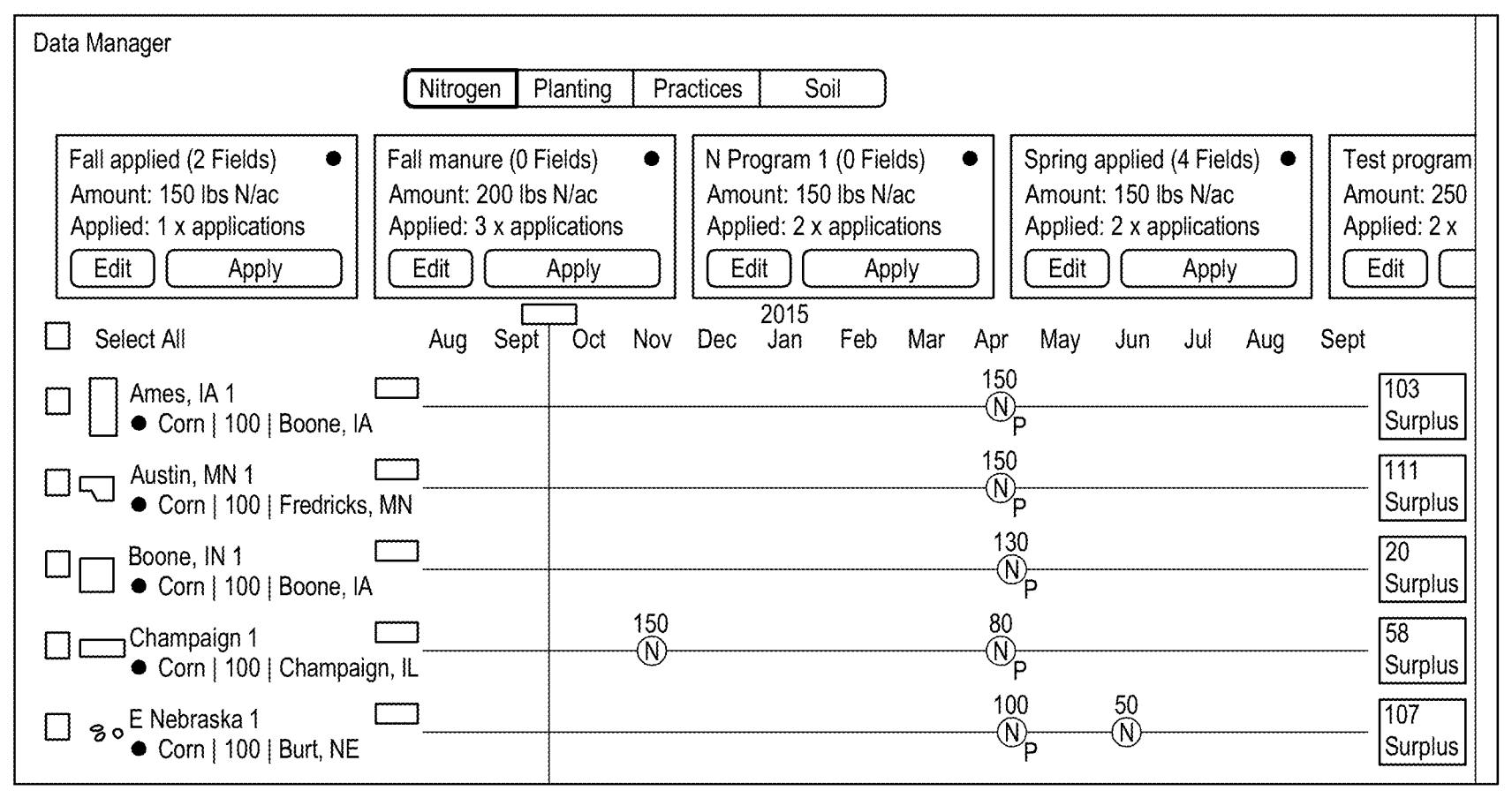

FIG. 2C depicts an example embodiment of a timeline view for data entry. Using the display depicted in FIG. 2C, a user computer can input a selection of a particular field and a particular date for the addition of the event. Events depicted at the top of the timeline may include Nitrogen, Planting, Practices, and Soil. To add a nitrogen application event, a user computer may provide input to select the nitrogen tab. The user computer may then select a location on the timeline for a particular field to indicate an application of nitrogen on the selected field. In response to receiving a selection of a location on the timeline for a particular field, the data manager may display a data entry overlay, allowing the user computer to input data pertaining to nitrogen applications, planting procedures, soil application, tillage procedures, irrigation practices, or other information relating to the particular field. For example, if a user computer selects a portion of the timeline and indicates an application of nitrogen, then the data entry overlay may include fields for inputting an amount of nitrogen applied, a date of application, a type of fertilizer used, and any other information related to the application of nitrogen.

In an embodiment, the data manager provides an interface for creating one or more programs. "Program," in this context, refers to a set of data pertaining to nitrogen applications, planting procedures, soil application, tillage procedures, irrigation practices, or other information that may be related to one or more fields, and that can be stored in digital data storage for reuse as a set in other operations. After a program has been created, it may be conceptually applied to one or more fields and references to the program may be stored in digital storage in association with data identifying the fields. Thus, instead of manually entering identical data relating to the same nitrogen applications for multiple different fields, a user computer may create a program that indicates a particular application of nitrogen and then apply the program to multiple different fields. For example, in the timeline view of FIG. 2C, the top two timelines have the "Spring applied" program selected, which includes an application of 150 lbs N/ac in early April. The data manager may provide an interface for editing a program. In an embodiment, when a particular program is edited, each field that has selected the particular program is edited. For example, in FIG. 2C, if the "Spring applied" program is edited to reduce the application of nitrogen to 130 lbs. N/ac, the top two fields may be updated with a reduced application of nitrogen-based on the edited program.

In an embodiment, in response to receiving edits to a field that has a program selected, the data manager removes the correspondence of the field to the selected program. For example, if a nitrogen application is added to the top field in FIG. 2C, the interface may update to indicate that the "Spring applied" program is no longer being applied to the top field. While the nitrogen application in early April may remain, updates to the "Spring applied" program would not alter the April application of nitrogen.

FIG. 2D depicts an example embodiment of a spreadsheet view for data entry. Using the display depicted in FIG. 2D, a user can create and edit information for one or more fields. The data manager may include spreadsheets for inputting information concerning Nitrogen, Planting, Practices, and Soil as depicted in FIG. 2D. To edit a particular entry, a user computer may select the particular entry in the spreadsheet and update the values. For example, FIG. 2D depicts an in-progress update to a target yield value for the second field. Additionally, a user computer may select one or more fields to apply one or more programs. In response to receiving a selection of a program for a particular field, the data manager may automatically complete the entries for the particular field based on the selected program. As with the timeline view, the data manager may update the entries for each field associated with a particular program in response to receiving an update to the program. Additionally, the data manager may remove the correspondence of the selected program to the field in response to receiving an edit to one of the entries for the field.

In an embodiment, model and field data is stored in model and field data repository 160. Model data comprises data models created for one or more fields. For example, a crop model may include a digitally constructed model of the development of a crop on the one or more fields. "Model," in this context, refers to an electronic digitally stored set of executable instructions and data values, associated with one another, which are capable of receiving and responding to a programmatic or another digital call, invocation, or request for resolution based upon specified input values, to yield one or more stored or calculated output values that can serve as the basis of computer-implemented recommendations, output data displays, or machine control, among other things.

Persons of skill in the field find it convenient to express models using mathematical equations, but that form of expression does not confine the models disclosed herein to abstract concepts; instead, each model herein has a practical application in a computer in the form of stored executable instructions and data that implement the model using the computer. The model may include a model of past events on the one or more fields, a model of the current status of the one or more fields, and/or a model of predicted events on the one or more fields. Model and field data may be stored in data structures in memory, rows in a database table, in flat files or spreadsheets, or other forms of stored digital data.

2.3 Hardware Overview

According to one embodiment, the techniques described herein are implemented by at least one special-purpose computing device. The special-purpose computing device may be hard-wired to perform the techniques or may include digital electronic devices such as at least one application-specific integrated circuit (ASIC) or field-programmable gate array (FPGA) that is persistently programmed to perform the techniques, or may include at least one general-purpose hardware processor programmed to perform the techniques according to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, mobile computing devices, wearable devices, networking devices or any other device that incorporates hard-wired and/or program logic to implement the techniques.

Figure 3:
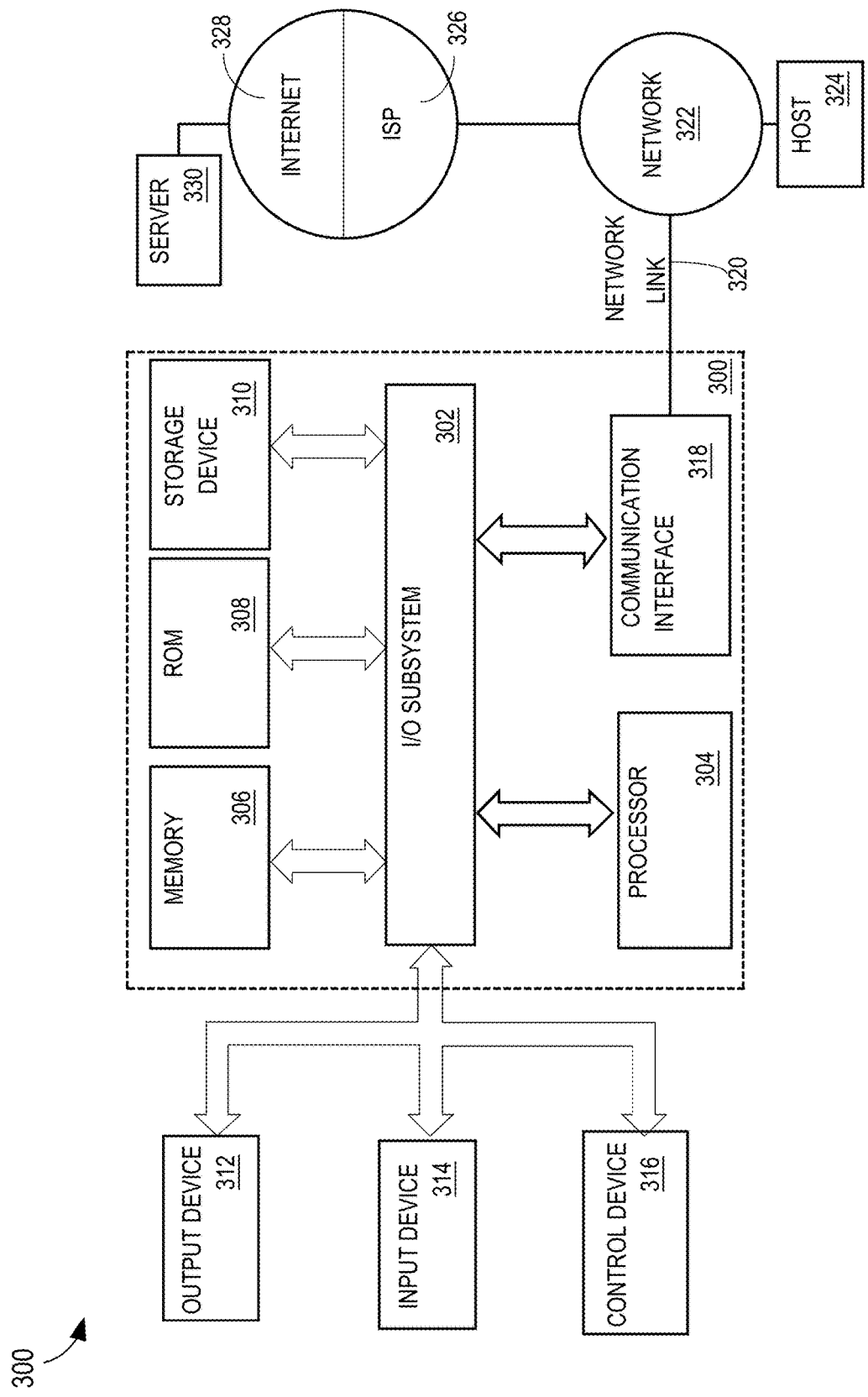
FIG. 3 is a block diagram that illustrates a computer system upon which an embodiment of the invention may be implemented.

For example, FIG. 3 is a block diagram that illustrates a computer system 300 upon which an embodiment of the present invention may be implemented. Computer system 300 includes a bus 302 or another communication mechanism for communicating information, and a hardware processor 304 coupled with bus 302 for processing information. Hardware processor 304 may be, for example, a general-purpose microprocessor.

Computer system 300 also includes a main memory 306, such as random-access memory (RAM) or another dynamic storage device, coupled to I/O subsystem or bus 302 for storing information and instructions to be executed by processor 304. Main memory 306 also may be used for storing temporary variables or other intermediate information during execution of instructions to be executed by processor 304. Such instructions, when stored in non-transitory computer-readable storage media accessible to processor 304, render computer system 300 into a special-purpose machine that is customized to perform the operations specified in the instructions.

Computer system 300 and further includes a read-only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a liquid crystal (LCD) display, for displaying information to a computer user. An input device 314, including alphanumeric and other keys, is coupled to bus 302 for communicating information and command selections to processor 304. Another type of user input device is control device 316, such as a touchpad, a microphone, a haptic control device, a mouse, a trackball, or cursor direction keys for communicating direction information and command selections to processor 304 and for controlling cursor movement on display 312. An input device may have two degrees of freedom in two axes, a first axis (e.g., x) and a second axis (e.g., y), that allows the device to specify positions in a plane. Input device 314 may include various sensors, such as a gyroscope, accelerometer, or Global Positioning System (GPS) transceiver, which communicate information to processor 304.

Computer system 300 may implement the techniques described herein using customized hard-wired logic, at least one ASIC or FPGA, firmware and/or program logic which in combination with the computer system causes or programs computer system 300 to be a special-purpose machine. According to one embodiment, the techniques herein are performed by computer system 300 in response to processor 304 executing at least one sequence of instructions contained in main memory 306. Such instructions may be read into main memory 306 from another storage medium, such as storage device 310. Execution of the sequences of instructions contained in main memory 306 causes processor 304 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 310. Volatile media includes dynamic memory, such as main memory 306. Common forms of storage media include, for example, a hard disk, solid-state drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wire, and fiber optics, including the wires that comprise bus 302. Transmission media can also take the form of acoustic or light waves, such as those generated during radio-wave and infra-red data communications.

Various forms of media may be involved in carrying at least one sequence of instruction to processor 304 for execution. For example, the instructions may initially be carried on a magnetic disk or solid-state drive of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated-services digital network (ISDN) card, cable modem, satellite modem, or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic, or optical signals that carry digital data streams representing various types of information.

Network link 320 typically provides data communication through at least one network to other data devices. For example, network link 320 may provide a connection through local network 322 to a host computer 324 or to data equipment operated by an Internet Service Provider (ISP) 326. ISP 326 in turn provides data communication services through the world-wide packet data communication network commonly referred to as the "Internet" 328. Local network 322 and Internet 328 both use electrical, electromagnetic, or optical signals that carry digital data streams. The signals through the various networks and the signals on network link 320 and through communication interface 318, which carry the digital data to and from computer system 300, are example forms of transmission media.

Computer system 300 can send messages and receive data, including program code, through the network(s), network link 320 and communication interface 318. In the Internet example, a server 330 might transmit a requested code for an application program through Internet 328, ISP 326, local network 322, and communication interface 318. The received code may be executed by processor 304 as it is received, and/or stored in storage device 310, or other non-volatile storage for later execution.

3. EXAMPLE—YIELD PREDICTION MODEL

3.1. Model Creation

In an embodiment, the computer system 130 is programmed or configured to create a model that can predict yield for a field location in which a horticultural product has been planted but not yet harvested. The model uses computer vision technology to identify individual instances of the horticultural product in the field location based on inputs representative of multi-band aerial imagery of the field location. In this context, a model is a set of data values, parameter values, and weight values that are stored in a data structure in memory of the computer system 130, in association with program instructions and/or configuration instructions that are capable of receiving input data parameters as digital data, executing transformations, and generating new digital output data that did not previously exist, using artificial intelligence and machine learning techniques. The data values, parameter values, and weight values are determined through a model training process. A model training process involves the processing of multi-band imagery training data that have been labeled with classification labels by one or more computer-implemented mathematical algorithms, such as linear regression algorithms, statistical and/or probabilistic algorithms, to train the model and cause modification of weight values so that the output data produced by the model after training is different than output data produced by the model before training.

Examples of classification labels include labels that identify particular classes, categories, grades, or growth stages, of particular horticultural products. For instance, a training sample of imagery that clearly depicts an instance of a particular fruit, for example, melon, might be labeled with the name of the fruit, melon, with the grade or growth stage of the melon, or simply as a positive training example. Likewise, a training sample of imagery that does not depict the particular fruit, grade, or growth stage might be labeled simply as a negative training example. Negative training examples can include examples of imagery in which no product is depicted as well as examples that depict different products or different grades or growth stages of the product. For example, to train a model to detect melons, negative training examples might include imagery that depicts strawberries or oranges but not melons. Similarly, positive training examples might depict melons in various spatial orientations or at various stages of ripeness or with or without foliage occlusion. The preparation of a training data set, including the assignment of classification labels to training samples, can be performed using various techniques including semi-automated manual labeling.

In a particular embodiment, as explained in more detail below, the model includes a set of neural network-based models, where each neural network-based model has a set of model parameters and includes a set of layers, each layer includes a set of nodes, and each node has an associated activation function, weight value, and backpropagation function.

In an embodiment, each of the neural network-based models is a deep learning model such that the training data can include raw imagery that is input directly into the models. During training, data values that have been extracted from multi-band aerial imagery and their corresponding classification labels are analyzed by the models, processed through the model layers, and associated with various predictive values by the activation functions of the various nodes of the models. A predictive value produced by a node indicates, for example, a mathematical likelihood that the data value input to the node corresponds to a known data value. The backpropagation function measures the difference between the output of the activation function and a ground truth value established by the classification label and adjusts the weight value for the node and possibly the weight values of other nodes, in accordance with that difference.

For example, during model training, a particular node of a particular layer of a particular model may receive as input a particular data value and classification label pair, where the particular data value may have been extracted from multi-band aerial imagery by an earlier model layer, or may be a computed value such as the output of a node of an earlier model layer. In response to the input of the particular data value and label at the particular node, during model training, the weight value of the particular node, and perhaps weight values of other nodes, may be adjusted via the backpropagation function so that the node outputs a data value that indicates a high likelihood that the particular data value corresponds to the classification label. The trained model is tested, retrained, and validated to result in reliably accurate detection, by the computer system 130, of individual instances of a horticultural product in multi-band aerial imagery.

Once trained, tested, and validated, the model is accessed and used, by a computer-implemented module or process known as a machine-learned or machine learning-based classifier, to generate model output that is based on new or previously unseen instances of multi-band aerial imagery. Yield as used herein may refer to an estimate of quantity of the product that ultimately will be harvested from a field location.

FIG. 4A illustrates a programmed process by which the computer system 130 generates one or more preconfigured yield prediction models using as training data multi-band image data provided by one or more data sources, such as image data representative of multi-band imagery produced by imaging system 115 via sensors 112 or obtained from external data 110. FIG. 4A may serve as an algorithm or instructions for programming the functional elements of the computer system 130 to perform the operations that are now described. The process of FIG. 4A is illustrated and described using functional blocks or modules for ease of discussion, but implementations of the process of FIG. 4A may define and arrange the functional elements in any suitable manner.

At block 402, the computer system 130 is configured or programmed to implement preprocessing of digital image data received from one or more data sources. The digital image data received from one or more data sources may be preprocessed to remove noise, distort effects, or confounding factors that could adversely affect the accuracy of data values extracted from the digital image data. Embodiments of data preprocessing may include, but are not limited to, removing data values commonly associated with outlier data values, specific measured data points that are known to unnecessarily skew other data values, data smoothing, aggregation, or sampling techniques used to remove or reduce additive or multiplicative effects from noise, and other filtering or data derivation techniques used to provide clear distinctions between positive and negative data inputs. A particular implementation of data preprocessing block 402 is shown in FIG. 4B, described below.

At block 404, the computer system 130 is configured or programmed to implement model training. In an embodiment, model training includes creating a set of neural network-based models that includes an individual model for each type of imagery in the training data. For example, where the training data includes aerial imagery of three different types, for instance, RGB imagery, NIR imagery, and thermal imagery, three different neural network-based models are created. The training examples in the different types of aerial imagery correspond to one another in time and geospatial location. For example, a training instance of RGB imagery would depict an aerial view of a particular field location at a particular date and time, and there would be corresponding training instances of NIR imagery and thermal imagery that also depict the same or similar aerial view of the same particular field location at the same or close to the same particular date and time, such as within a few hours or days, albeit using a different form of image sensor. This can be accomplished, for example, by collecting the three different types of imagery simultaneously via the same UAV device.

Initially, each of the individual imagery type-specific neural network-based models is trained, separately, to recognize, using computer vision technology, the horticultural product of interest, in a particular type of imagery. To do this, for each imagery type-specific model, an initial pre-training step is performed, in which a "background" model is selected or created. A background model as used herein may refer to a model that has been trained for a general purpose, such as detecting landscapes or people, rather than a specific classification objective, such as detecting a particular type of fruit or a particular grade or growth stage of a horticultural product. In some embodiments, the Common Objects in Context (COCO) dataset is used to pre-train the RGB model, and datasets that contain imagery of random visual scenes in NIR and thermal imagery, respectively, are used to pre-train the NIR and thermal imagery models.

Once an individual imagery type-specific model has been pre-trained, a transfer learning process is used to tune each of the imagery type-specific models to recognize the particular horticultural product of interest in training data representative of the particular imagery type. Transfer learning is a process by which a pre-trained model is adapted to a particular purpose. To perform transfer learning, the weights of most of the layers of a model are frozen; that is fixed, or not allowed to be changed via backpropagation, while the weights of only a small subset of all of the model layers are allowed to be adjusted, when the specific-purpose training data is introduced during tuning. In a particular embodiment, tuning a model means that only the model endpoints are trained to recognize the particular horticultural product of interest.

Each of the individual imagery type-specific models is transfer-learned in this manner. For example, if the horticultural product of interest is melons, then the endpoints of each model are trained on positive and negative training examples for melons using the particular type of imagery for which the model has been created. Thus, if one of the models has been individually created to detect melons in thermal imagery, only the endpoints of that model are transfer learned on thermal imagery melon training data. Similarly for models that are individually created to detect melons in RGB imagery and NIR imagery, respectively, only the endpoints of those models are transfer learned on RGB imagery melon training data and NIR imagery melon training data, respectively.

After each of the individual imagery type-specific models has been tuned to recognize the horticultural product of interest in a particular type of aerial imagery, the individual models are combined into a single, multi-band model. To do this, a particular layer is chosen at which to combine the models, and then the models are combined using, for example, summation or convolution. In an embodiment, the models are combined at the next-to-last layer. The multi-band model is then retrained end to end using the same training datasets that were used to train the individual models.

At block 406, each of the individual imagery type-specific models and/or the combined multi-band model is validated, for example by comparing model output for a portion of the training dataset to ground truth data. Model validation may return to model training block 404 via a feedback loop, for additional training to be performed if validation is unsuccessful. At block 408, each of the individual imagery type-specific models and/or the combined multi-band model is tested with previously unseen input data. At block 410, the computer system 130 is configured or programmed to store each of the individual imagery type-specific models and/or the combined multi-band model in computer memory for use by the machine learning-based classifier. The operation of the machine learning-based classifier is described below with reference to FIG. 5.

3.2. Data Pre-Processing

FIG. 4B illustrates a programmed process by which the computer system 130 prepares the training data to be used to train the individual imagery type-specific models. After the pre-processing, the training data used to train the individual imagery type-specific models includes digital image data that has been extracted from the corresponding imagery of a particular band. Examples of image data include data values that indicate sensor measurements at various two-dimensional coordinate locations of the image. For instance, image data extracted from RGB imagery may include pixel intensity values for different pixel coordinates of the image; image data extracted from NIR imagery may include a measurement of infrared energy absorption for different coordinate locations of the image; image data extracted from thermal imagery may include a measurement of thermal energy (temperature) at different coordinate locations of the image.

In an embodiment, the multi-band imagery used to create the individual imagery type-specific models is tagged with geographic location data that corresponds to the location on the ground of the portion of the landscape depicted in the imagery. For example, a UAV equipped with a GPS sensor flying over a field may capture a first set of multi-band images at a first field location within the field, a second set of multi-band images at a second field location within the field, and so on. In some experiments, an Orlan 10E UAV has been used with a customized 3 W engine. In some experiments, the UAV has been flown at an altitude in a range of about five kilometers and images have been captured in field locations having sizes in a range of about 20 meters by 20 meters, for example.

As part of the image capture process, each set of multi-band images is tagged with its corresponding geographic location data as indicated by the on-board GPS sensor at the time of image capture. As each set of multi-band images may represent a different, particular sub-field location, the disclosed technologies can be used to generate yield information for the different, particular sub-field locations.

FIG. 4B may serve as an algorithm or instructions for programming the functional elements of the computer system 130 to perform the operations that are now described. The process of FIG. 4B is illustrated and described using functional blocks or modules for ease of discussion, but implementations of the process of FIG. 4B may define and arrange the functional elements in any suitable manner.

The process of FIG. 4B begins by receiving raw imagery files as input. At block 420, the computer system 130 is configured or programmed to perform image correction on one or more of the training samples of multi-band image data. Image correction block 420 corrects flaws in raw remotely sensed image data that may be caused by, for example, the curved shape of the Earth and cloud cover. An example of image correction techniques that may be performed at block 420 includes geometric correction and radiometric correction. Image correction can be performed in an automated or semi-automated manner using, for example, image correction functions available from an open-source library such as OpenCV.

At block 422, the computer system 130 is configured or programmed to perform image stitching. Image stitching block 422 connects or links individual field location images of a certain type together to form a composite image of a larger field location. For example, RGB images of neighboring field locations may be tiled together based on portions of the fields of view that overlap. Image stitching can be performed in an automated or semi-automated manner using, for example, image stitching functions available from an open-source library such as OpenCV.

At block 424, the computer system 130 is configured or programmed to perform image alignment. Image alignment block 424 determines the spatial mapping of elements depicted in one image with corresponding elements in another image. For example, block 424 may analyze the output of block 422 to ensure that the portions of elements depicted in overlapping portions of the images are spatially aligned. If a pair of images that has been stitched by block 422 are not aligned, block 424 improves the alignment and returns to block 422 via a feedback loop to re-perform the image stitching. Image alignment can be performed in an automated or semi-automated manner using, for example, image alignment functions available from an open source library such as OpenCV.

At block 426, the computer system 130 is configured or programmed to perform image stacking. Image stacking block 426 creates depth-wise arrangements of images of the same scene. For example, the computer system may stack imagery of the same field location in the three different RGB bands in order to prepare a training data set for an RGB model. The computer system 130 may also stack the RGB, NIR, and thermal imagery of the same field location to prepare a training set for the re-training phase of the combined model. Image stacking can be performed in an automated or semi-automated manner using, for example, image stacking functions available from an open-source library such as OpenCV. While embodiments describe using RGB, NIR, and thermal imagery, other embodiments may comprise any combination thereof and/or utilize additional types of imagery. For example, an embodiment of the model may only use RGB and NIR imagery. As another example, an embodiment of the model may use thermal imagery and ultraviolet imagery.

At block 428, the computer system 130 is configured or programmed to perform image annotation. Image annotation block 428 adds annotations to the images that serve to identify individual instances of the horticultural product in the imagery. An example of an annotation is a bounding box. Annotations may be added in an automated or semi-automated manner using, for example, image annotation functions available from an open source library such as OpenCV.

At block 430, the computer system 130 is configured or programmed to perform training data augmentation. Augmentation block 430 is an optional process that may be performed when the set of imagery to be used for training is not very large. Augmentation block 430 may be utilized, for example, when the horticultural product of interest is very specific or uncommon, or for some reason the universe of imagery depicting the horticultural product of interest is small. Augmentation block 430 generates additional training examples using the existing training data set by, for example, creating a rotated or re-sized version of an existing training image. A training data set may be augmented in an automated or semi-automated manner using, for example, augmentation functions available from an open-source library such as OpenCV.

In an operational phase of the classifier, new or previously unseen imagery that is to be analyzed by the classifier is pre-processed using a process similar to blocks 422, 424, 426. Blocks 428 and 430 are used to prepare training data during the model training phase but are not used during the operational phase of the classifier.

3.3. Model Structure

FIG. 4C illustrates a programmed process 450 by which the computer system 130 performs model training, in an embodiment. FIG. 4C may serve as an algorithm or instructions for programming the functional elements of the computer system 130 to perform the operations that are now described. The process of FIG. 4C is illustrated and described using blocks or modules for ease of discussion, but implementations of the process of FIG. 4C may define and arrange the elements in any suitable manner.

Process 450 includes individual training processes 452, 454, 456. In an embodiment, process 450 is performed using an implementation of the mask region convolutional neural network (Mask-RCNN) object detection method with a ResNet101 backbone. In an embodiment, the individual training processes 452, 454, 456 are performed in parallel. Each of the individual training processes 452, 454, 456 results in a convolutional neural network (CNN)-based model that has been trained to recognize instances of a horticultural product of interest in a different type of imagery.

Training process 452 begins with a pre-trained model; for example, an object detection model that has been trained using the COCO dataset. The weights of the first and last layers of the pre-trained model are unfrozen and then the pre-trained model is tuned using RGB imagery training data 458. Elements 460 represent computational layers such as convolutions that are performed on the training data during tuning to produce an individual imagery type-specific (RGB) CNN 462. After tuning, the weights of CNN 462 are fixed so that CNN 462 is capable of detecting instances of the horticultural product of interest in RGB imagery only. In other words, after tuning, CNN 462 is capable of detecting the horticultural product of interest, but not other types of objects. For example, if the training data used for fine tuning consists of imagery that depicts only watermelons, then after fine tuning, CNN 462 would be capable of detecting watermelons but would not be capable of detecting corn or apples.

Similarly, the training process 454 begins with a pre-trained model. The weights of the first and last layers of the pre-trained model are unfrozen and then the pre-trained model is tuned using NIR imagery training data 464. Elements 466 represent computational layers such as convolutions that are performed on the training data during tuning to produce an individual imagery type-specific (NIR) CNN 468. After tuning, the weights of CNN 468 are fixed so that CNN 468 is capable of detecting instances of the horticultural product of interest in NIR imagery only. In other words, after tuning, CNN 468 is not capable of detecting any types of objects other than the horticultural product of interest.

In an embodiment, both the RGB imagery training data 458 and the NIR imagery training data 464 include imagery in three bands; thus, the first convolutional layer is configured for three bands by having three channels and 3-band transfer learning is performed in both process 452 and process 454.

Training process 456 also begins with a pre-trained model. The weights of the first and last layers of the pre-trained model are unfrozen and then the pre-trained model is tuned using thermal imagery training data 470. Elements 472 represent computational layers such as convolutions that are performed on the training data during tuning to produce an individual imagery type-specific (thermal) CNN 474. Because thermal imagery training data 470 includes only one band, the first convolutional layer of the model is a single channel convolutional layer. After tuning, the weights of CNN 474 are fixed so that CNN 474 is capable of detecting instances of the horticultural product of interest in thermal imagery only. In other words, after tuning, CNN 474 is not capable of detecting any types of objects other than the horticultural product of interest.

The individual imagery type-specific models 462, 468, 474 are combined, for example at the next to last computational layer (for example, between the third and fourth computational blocks of the ResNet backbone) using a simple addition 476, 478 to produce a combined model 480. The combined model 480 is then re-trained end-to-end. In an embodiment, the upstream (pre-combination weights) established from the previous parallel trainings of models 462, 468, 474 are frozen and the last computational convolutional block and the classifier are re-trained end to end on composite training data 484. End to end training as used herein may refer to a technique that is used to train a deep neural network. For example, models 462, 468, 474, and combined model 480 are deep learning models that can be trained directly on raw image data, in an embodiment.

Composite training data 484 includes the RGB, NIR, and thermal imagery stacked in a predetermined order. In an embodiment, composite training data 484 has the 3 bands of RGB training data on top, followed by the 3 bands of NIR training data stacked below the RGB training data, followed by the 1 band of thermal imagery training data stacked below the NIR training data.

4. EXAMPLE—YIELD PREDICTION PROCESS

Figure 5:
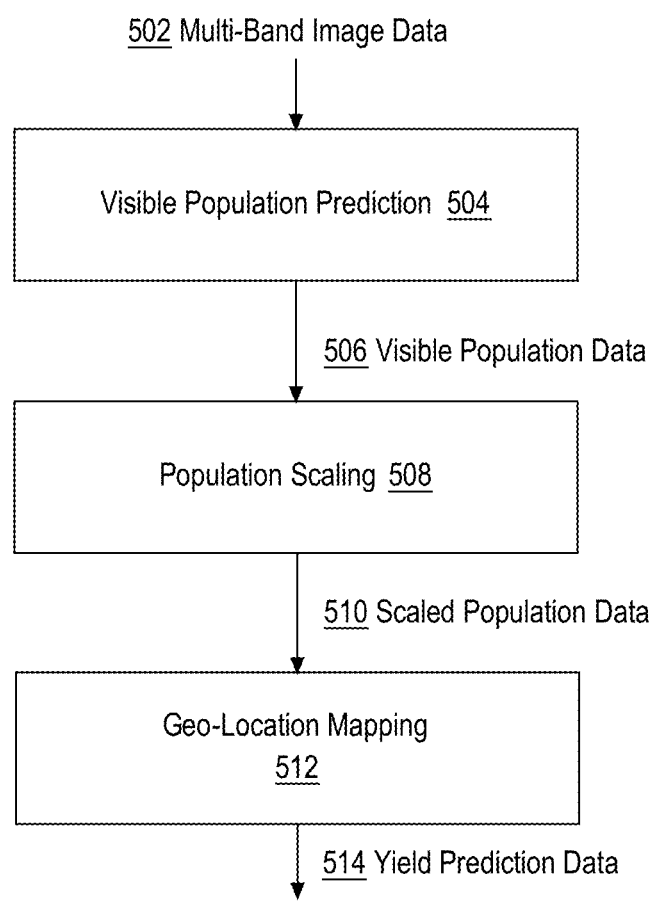
FIG. 5 illustrates a flow of a programmed process by which the example computer system generates yield prediction data, which can be used by other apparatus with which the system may interoperate.

FIG. 5 illustrates a programmed process by which the computer system 130 generates produces yield prediction data from multi-band image data provided by one or more data sources, such as multi-band imagery of a field location that contains a horticultural product of interest, which may be produced by imaging system 115 via sensors 112 or obtained from external data 110. FIG. 5 may serve as an algorithm or instructions for programming the functional elements of the computer system 130 to perform the operations that are now described. The process of FIG. 5 is illustrated and described using functional blocks or modules for ease of discussion, but implementations of the process of FIG. 5 may define and arrange the functional elements in any suitable manner.

At block 504, the computer system 130 is configured or programmed to analyze multi-band image data 502 and output visible population data 506. To do this, visible population prediction block 504 inputs multi-band image data 502 into a neural network-based classifier that has been trained to detect clearly visible individual instances of a horticultural product of interest in a field location represented by multi-band imagery using the model training techniques described herein. Clearly visible instances include instances of the horticultural product that are detectable by the classifier and do not include instances of the horticultural product that are not detectable by the classifier due to occlusion resulting from, for example, foliage. Visible population data 506 includes annotation data, such as bounding boxes that identify the visible instances of the horticultural product of interest in the multi-band image data. In some embodiments, visible population prediction block 504 counts the bounding boxes to produce an initial yield prediction and includes the initial yield prediction in the visible population data 506.

At block 508, the computer system 130 is configured or programmed to scale the visible population data 506 as needed to account for instances of the horticultural product that were not detected from the imagery at block 504. To do this, a scaling function may be used which approximates the percentage of un-detected instances of the horticultural product based on historical data. For instance, experiments may have shown that the quantity of un-detected instances of product correlates with the amount of foliage occlusion and that this correlation can be represented by a percentage value which functions as a scaling factor, for example a multiplier or a bias. For example, if the scaling factor is 140% for a field location with medium occlusion, then if the visible population data 506 indicates a count of 100 visible product, the scaled population data 510 may be estimated at 140 total product for the field location.

At block 512, the computer system 130 is configured or programmed to correlate the scaled population data 510 with the geographic location data of the field location for which the scaled population data 510 was produced. To do this, geo-location mapping block 512 combines the field location-specific geographic location data included in the multi-band image data 502 to produce yield prediction data 514 for a particular field location. As described above, the geographic location data is obtained at the time that the imagery is captured, for example by a GPS device, and stored with the multi-band image data 502, for example by imaging system 115.

At or subsequent to block 512, the computer system 130 is configured or programmed to output the yield prediction data 514 in a form of electronic communication that is capable of being used by a remote device to control an agricultural or horticultural operation. For instance, portions of yield prediction data 514 may be incorporated into one or more scripts that may be provided to an application controller 114. The application controller 114, which is communicatively coupled to computer system 130 via the network(s) 109, is programmed or configured to receive the yield prediction data 514 via the one or more scripts. The one or more scripts containing yield prediction data 514 are used to control an operating parameter of a device, vehicle or implement, such as computing device 104, apparatus 117 or device 111, from the computer system 130. For instance, a controller area network (CAN) bus interface may be used to enable communications from the computer system 130 to the computer 116 via the network(s) 109 or from the computer 116 to the apparatus 117. The network(s) 109 may be used to enable communications from the imaging system 115 to the computer system 130, from the computer system 130 to the imaging system 115, from the computer system 130 to the computing device 104 or the computer 116, from the computing device 104 or the computer 116 to the computer system 130.

5. ADDITIONAL EXAMPLES

Illustrative examples of the technologies disclosed herein are provided below. An embodiment of the technologies may include any of the examples or a combination of the described below.

In an example 1, a computer-implemented method includes inputting, to a machine-learned classifier that has been created using a set of neural network-based models, multi-band digital image data that represents an aerial view of an agricultural field location containing an horticultural product, each neural network-based model of the set of neural network-based models including a plurality of layers, each layer of the plurality of layers including a plurality of nodes and a plurality of weights associated with the plurality of nodes; outputting, by the classifier, annotated image data, the annotated image data including annotation data indicative of individual instances of the horticultural product in the agricultural field location; using the annotated image data, computing a first predicted yield for the agricultural field location; adjusting the first predicted yield by a scaling factor to produce a second predicted yield for the agricultural field location; outputting the second predicted yield in a form of electronic communication capable of being used by a remote device to control an horticultural operation.

An example 2 includes the subject matter of example 1, the multi-band image data including first image data produced using a red-green-blue (RGB) sensor and second image data produced using a near-infrared (NIR) sensor and third image data produced using a thermal sensor. An example 3 includes the subject matter of example 1 or example 2, the set of neural network-based models including a first neural network-based model having weights trained using red-green-blue (RGB) images of the horticultural product, a second neural network-based model having weights trained using near-infrared (NIR) images of the horticultural product, and a third neural network-based model having weights trained using thermal images of the horticultural product. An example 4 includes the subject matter of example 3, the classifier being created by combining a next-to-last layer of the first neural network-based model with a corresponding next-to-last layer of the second neural network-based model and a corresponding next-to-last layer of the third neural network-based model. An example 5 includes the subject matter of any of examples 1-4, the classifier being trained to identify different instances of the horticultural product in the agricultural field location using a mask region convolutional neural network (Mask RCNN)-based model. An example 6 includes the subject matter of any of examples 1-5, further including linking and outputting, with the second predicted yield, geographic location data obtained from the multi-band image data. An example 7 includes at least one non-transitory storage medium storing instructions which, when executed by at least one processor, cause performance of operations recited in any of claims 1-6. An example 8 includes a computer system including at least one processor and at least one non-transitory storage media storing instructions which, when executed by the at least one processor cause the computer system to be capable of performance of operations recited in any of claims 1-6. An example 9 includes an electronic device including means for performance of operations recited in any of claims 1-6. An example 10 includes a method, system, or apparatus, as shown and described in any one or more paragraphs of the disclosure and/or any one or more of the drawing figures.

6. BENEFITS, EXTENSIONS, AND ALTERNATIVES

The techniques of this disclosure offer numerous practical benefits and improvements. For example, yield predictions are improved by the particular configurations of deep neural networks that have been trained in an efficient manner to process and analyze multi-band aerial imagery of field locations containing a particular horticultural product. The use of multiple bands of imagery improves the accuracy of the yield predictions. The use of a scaling function can further improve the accuracy of the yield predictions by accounting for occlusion. These and other aspects of the disclosed technologies enable aerial imagery to be used for precision horticultural applications.

Additionally, yield predictions generated by embodiments can be used to improve the positioning and operation of horticultural machines at planting time and/or at harvest time. Graphical displays, of field data, such as field maps that may be displayed on a cab computer, also can be improved based on predictions that are generated by embodiments. In this manner, the disclosure integrates the processes that are described into practical applications including but not limited to improving machine operations associated with horticultural planting and harvesting. Furthermore, the disclosure is not limited to horticultural applications but rather provides clear improvements to multiple technologies including horticulture, agriculture, agriscience, crop management, and field management, as well as graphical user interfaces and graphical information displays.

All processes disclosed herein are intended to be implemented using programmed computers to accomplish the benefits and improvements that are described above via specific processes that are disclosed. The disclosure is directed to these processes, not to concepts. Nothing in the disclosure is intended or should be interpreted as disclosing or claiming an abstract idea, product of nature, law of nature, or natural phenomenon. Nothing in the disclosure is intended or should be interpreted as disclosing or claiming only mathematical concepts, certain methods of organizing human activity or mental processes, and any interpretation of the claims to cover any of the foregoing cannot be reasonable in view of the disclosure and this paragraph.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer-implemented method comprising:
inputting, to a machine-learned classifier that has been created using a set of neural network-based models, multi-band digital image data that represents an aerial view of an agricultural field location containing a horticultural product, each neural network-based model of the set of neural network-based models comprising a plurality of layers, each layer of the plurality of layers comprising a plurality of nodes and a plurality of weights associated with the plurality of nodes;
outputting, by the classifier, annotated image data, the annotated image data comprising annotation data identifying individual instances of the horticultural product in the agricultural field location;
using the annotated image data, computing a first predicted yield for the agricultural field location.

2. The method of claim 1, further comprising adjusting the first predicted yield by a scaling factor to produce a second predicted yield for the agricultural field location, and outputting the second predicted yield as the predicted yield.

3. The method of claim 1, wherein the multi-band digital image data comprises first image data produced using a red-green-blue (RGB) sensor and second image data produced using a near infrared (NIR) sensor and third image data produced using a thermal sensor.

4. The method of claim 1, wherein the set of neural network-based models comprises a first neural network-based model having weights trained using red-green-blue (RGB) images of the horticultural product, a second neural network-based model having weights trained using near infrared (NIR) images of the horticultural product, and a third neural network-based model having weights trained using thermal images of the horticultural product.

5. The method of claim 4, wherein the classifier is created by combining a next-to-last layer of the first neural network-based model with a corresponding next-to-last layer of the second neural network-based model and a corresponding next-to-last layer of the third neural network-based model.

6. The method of claim 1, wherein the classifier is trained to identify different instances of the horticultural product in the agricultural field location using a mask region convolutional neural network (Mask RCNN)-based model.

7. The method of claim 1, further comprising linking and outputting, with the first predicted yield, geographic location data obtained from the multi-band image data.

8. The method of claim 1, further comprising:
using the first predicted yield, generating one or more scripts for an application controller and sending the one or more scripts to the application controller, wherein the application controller executes the one or more scripts to cause the application controller to control an operating parameter of an agricultural implement to cause the agricultural implement to execute an agricultural or horticultural operation on the agricultural field location.

9. A system comprising:
one or more processors;
a memory storing instructions which, when executed by the one or more processors, cause performance of:
inputting, to a machine-learned classifier that has been created using a set of neural network-based models, multi-band digital image data that represents an aerial view of an agricultural field location containing a horticultural product, each neural network-based model of the set of neural network-based models comprising a plurality of layers, each layer of the plurality of layers comprising a plurality of nodes and a plurality of weights associated with the plurality of nodes;
outputting, by the classifier, annotated image data, the annotated image data comprising annotation data identifying individual instances of the horticultural product in the agricultural field location;
using the annotated image data, computing a first predicted yield for the agricultural field location.

10. The system of claim 9, wherein the instructions, when executed by the one or more processors further cause performance of adjusting the first predicted yield by a scaling factor to produce a second predicted yield for the agricultural field location, and outputting the second predicted yield as the predicted yield.

11. The system of claim 9, wherein the multi-band digital image data comprises first image data produced using a red-green-blue (RGB) sensor and second image data produced using a near infrared (NIR) sensor and third image data produced using a thermal sensor.

12. The system of claim 9, wherein the set of neural network-based models comprises a first neural network-based model having weights trained using red-green-blue (RGB) images of the horticultural product, a second neural network-based model having weights trained using near infrared (NIR) images of the horticultural product, and a third neural network-based model having weights trained using thermal images of the horticultural product.

13. The system of claim 12, wherein the classifier is created by combining a next-to-last layer of the first neural network-based model with a corresponding next-to-last layer of the second neural network-based model and a corresponding next-to-last layer of the third neural network-based model.

14. The system of claim 9, wherein the classifier is trained to identify different instances of the horticultural product in the agricultural field location using a mask region convolutional neural network (Mask RCNN)-based model.

15. The system of claim 9, wherein the instructions, when executed by the one or more processors, further cause performance of linking and outputting, with the first predicted yield, geographic location data obtained from the multi-band image data.

16. The system of claim 9, wherein the instructions, when executed by the one or more processors, further cause performance of using the first predicted yield, generating one or more scripts for an application controller and sending the one or more scripts to the application controller, wherein the application controller executes the one or more scripts to cause the application controller to control an operating parameter of an agricultural implement to cause the agricultural implement to execute an agricultural or horticultural operation on the agricultural field location.

17. One or more non-transitory computer-readable media storing instructions which, when executed, cause performance of:
   inputting, to a machine-learned classifier that has been created using a set of neural network-based models, multi-band digital image data that represents an aerial view of an agricultural field location containing a horticultural product, each neural network-based model of the set of neural network-based models comprising a plurality of layers, each layer of the plurality of layers comprising a plurality of nodes and a plurality of weights associated with the plurality of nodes;
   outputting, by the classifier, annotated image data, the annotated image data comprising annotation data identifying individual instances of the horticultural product in the agricultural field location;
   using the annotated image data, computing a first predicted yield for the agricultural field location.

18. The one or more non-transitory computer-readable media of claim 17, wherein the instructions, when executed by the one or more processors further cause performance of adjusting the first predicted yield by a scaling factor to produce a second predicted yield for the agricultural field location, and outputting the second predicted yield as the predicted yield.

19. The one or more non-transitory computer-readable media of claim 17, wherein the multi-band digital image data comprises first image data produced using a red-green-blue (RGB) sensor and second image data produced using a near infrared (NIR) sensor and third image data produced using a thermal sensor.

20. The one or more non-transitory computer-readable media of claim 17, wherein the set of neural network-based models comprises a first neural network-based model having weights trained using red-green-blue (RGB) images of the horticultural product, a second neural network-based model having weights trained using near infrared (NIR) images of the horticultural product, and a third neural network-based model having weights trained using thermal images of the horticultural product and wherein the classifier is created by combining a next-to-last layer of the first neural network-based model with a corresponding next-to-last layer of the second neural network-based model and a corresponding next-to-last layer of the third neural network-based model.

* * * * *